United States Patent
Miyashita et al.

(10) Patent No.: US 11,315,347 B2
(45) Date of Patent: Apr. 26, 2022

(54) SOLID OBJECT DETECTION DEVICE AND SOLID OBJECT DETECTION METHOD

(71) Applicant: CLARION CO., LTD., Saitama (JP)

(72) Inventors: Ayano Miyashita, Saitama (JP); Naoki Shimizu, Saitama (JP); Hiroaki Andou, Kanagawa (JP); Kengo Asaki, Kanagawa (JP)

(73) Assignee: CLARION CO., LTD., Saitama (JP)

( * ) Notice: Subject to any disclaimer, the term of this patent is extended or adjusted under 35 U.S.C. 154(b) by 96 days.

(21) Appl. No.: 16/862,639

(22) Filed: Apr. 30, 2020

(65) Prior Publication Data

US 2020/0356792 A1 Nov. 12, 2020

(30) Foreign Application Priority Data

May 10, 2019 (JP) .............................. JP2019-090116

(51) Int. Cl.
  *G06V 20/58* (2022.01)
  *G06V 10/50* (2022.01)

(52) U.S. Cl.
  CPC .............. *G06V 20/58* (2022.01); *G06V 10/50* (2022.01)

(58) Field of Classification Search
  CPC ......................... G06K 9/00805; G06K 9/4642
  See application file for complete search history.

(56) References Cited

U.S. PATENT DOCUMENTS 6,456,730 B1 * 9/2002 Taniguchi ............ G06K 9/3241
                                                         382/103
2011/0310245 A1 * 12/2011 Tsuchiya ................. G06T 7/254
                                                         348/135

(Continued)

FOREIGN PATENT DOCUMENTS

JP  2008-227646 A   9/2008
WO  2014/017521 A1  1/2014

OTHER PUBLICATIONS

A Extended European Search Report mailed by European Patent Office dated Sep. 25, 2020 in corresponding European patent application No. 20173751.7-1207.

(Continued)

*Primary Examiner* — Pinalben Patel
(74) *Attorney, Agent, or Firm* — IP Business Solutions, LLC

(57) ABSTRACT

A solid object detection device includes an overhead view transformation processing unit transforming first and second photographed images photographed by a camera at different timings in travel of a vehicle into first and second overhead view images, respectively, a subtracted image generation unit generating a subtracted image between the first and second overhead view images whose photographing positions are aligned with each other, a solid object position specification unit specifying a position of a solid object present around the vehicle based on the subtracted image, and a masked subtracted image generation unit generating a masked subtracted image in which a region other than a solid object candidate region as a candidate where the solid object appears in the subtracted image is masked and the solid object position specification unit specifies a position of the solid object in the subtracted image based on the masked subtracted image.

10 Claims, 27 Drawing Sheets

(56) References Cited

U.S. PATENT DOCUMENTS

| | | | |
|---|---|---|---|
| 2013/0343646 A1* | 12/2013 | Hata | G06T 7/90 |
| | | | 382/165 |
| 2014/0160276 A1* | 6/2014 | Pliefke | H04N 5/272 |
| | | | 348/118 |
| 2014/0368656 A1* | 12/2014 | Hayakawa | G06K 9/00798 |
| | | | 348/148 |
| 2015/0071490 A1 | 3/2015 | Fukata et al. | |
| 2015/0125031 A1 | 5/2015 | Hayakawa et al. | |
| 2016/0196654 A1* | 7/2016 | Aoki | G06T 7/246 |
| | | | 382/103 |
| 2017/0098135 A1* | 4/2017 | Munteanu | G06K 9/4642 |

OTHER PUBLICATIONS

A European Office Action mailed by European Patent Office dated Jun. 15, 2021 in corresponding European patent application No. 20 173 751.7-1207.

\* cited by examiner

FIG.5
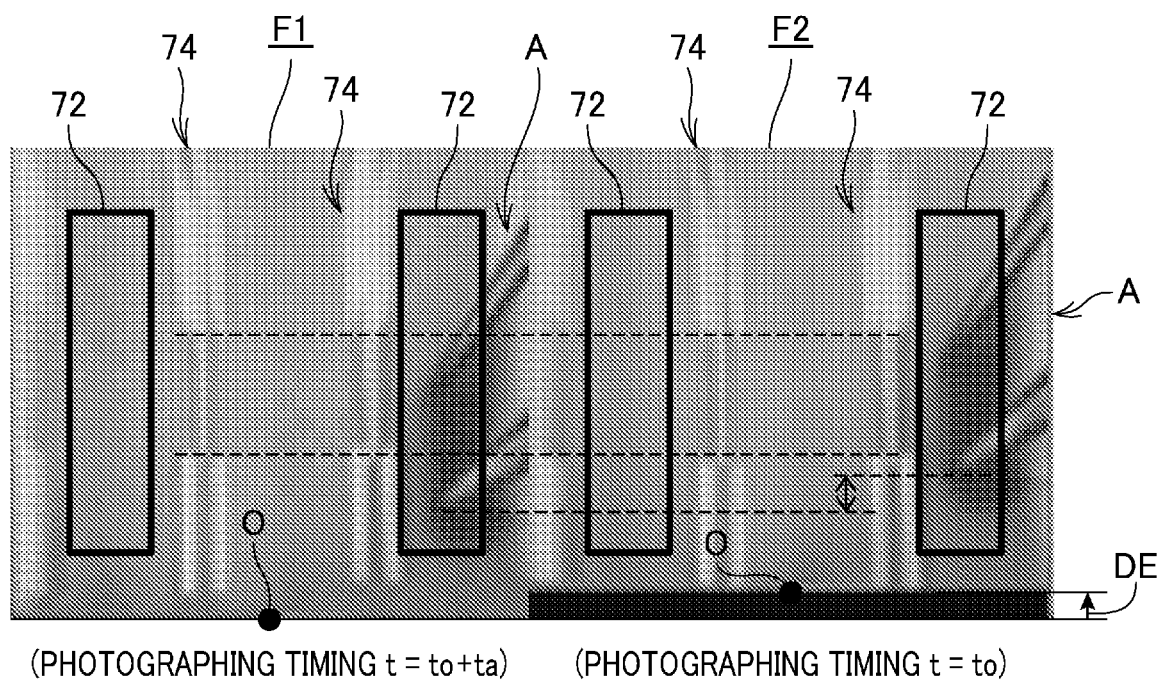
(PHOTOGRAPHING TIMING t = to+ta)    (PHOTOGRAPHING TIMING t = to)
⇩ EXTRACT DIFFERENCE
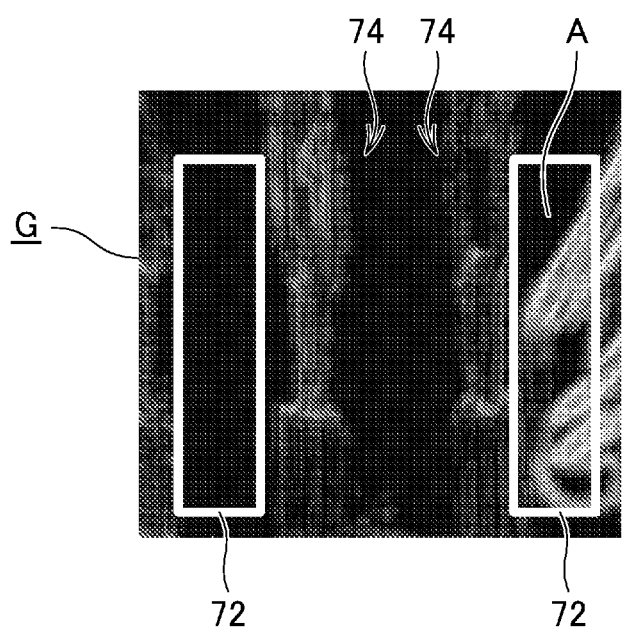

FIG.7
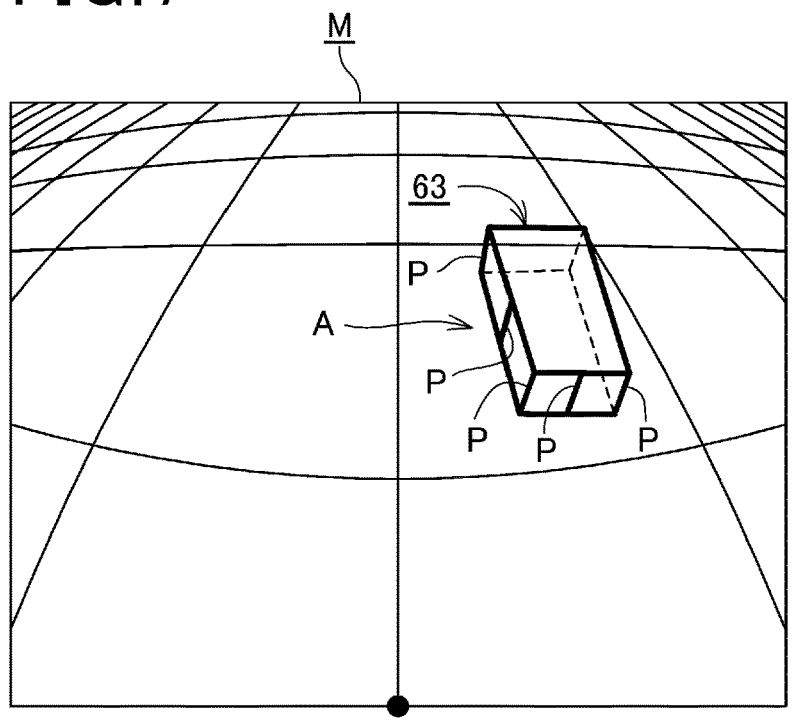
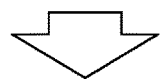
OVERHEAD VIEW TRANSFORMATION
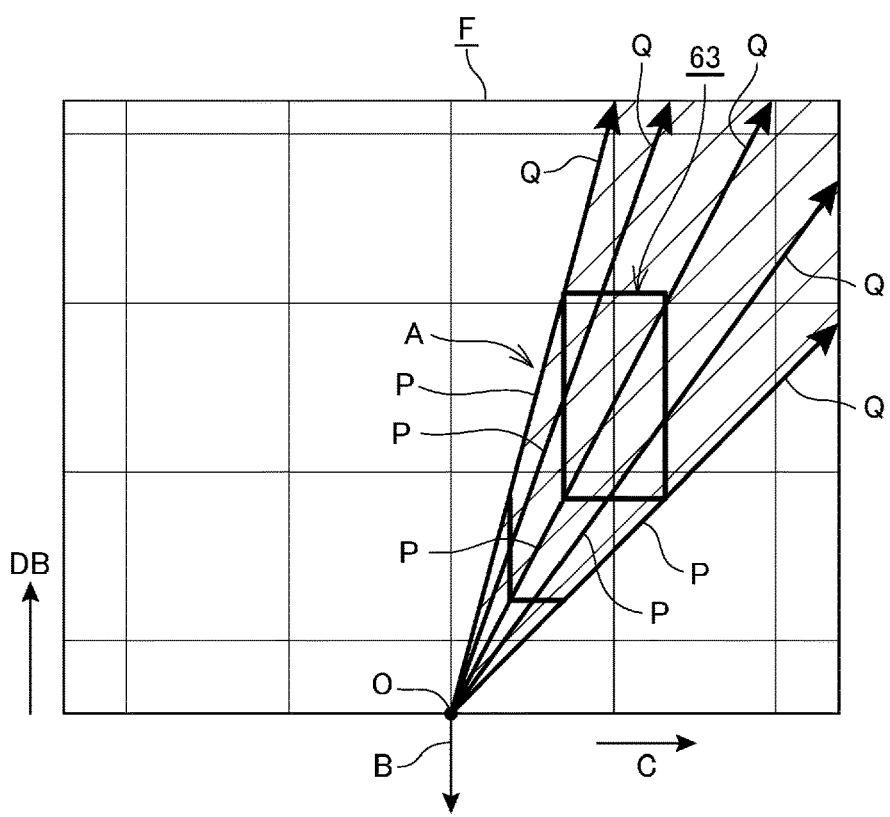

FIG.10
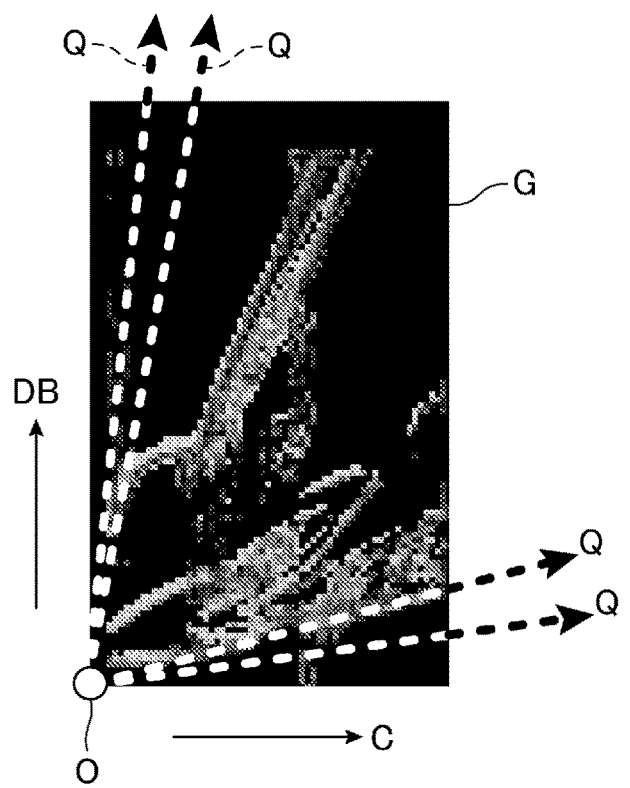
CALCULATE ACCUMULATION VALUE
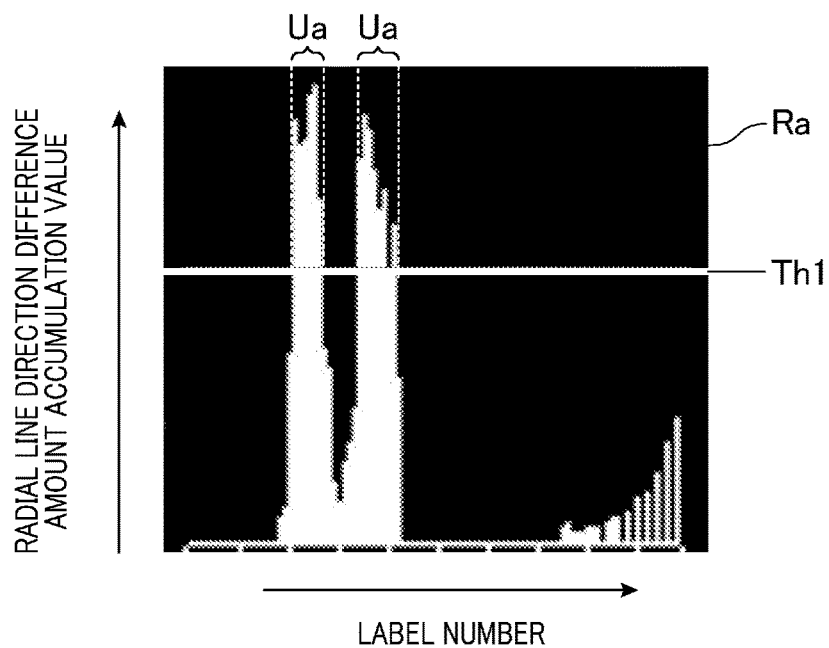

FIG.11
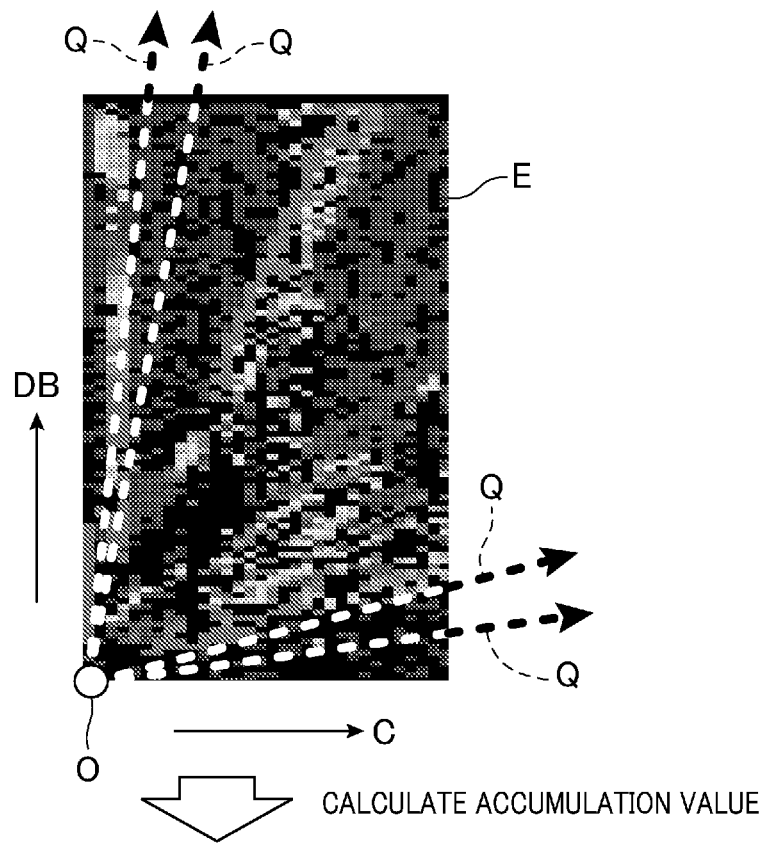
CALCULATE ACCUMULATION VALUE
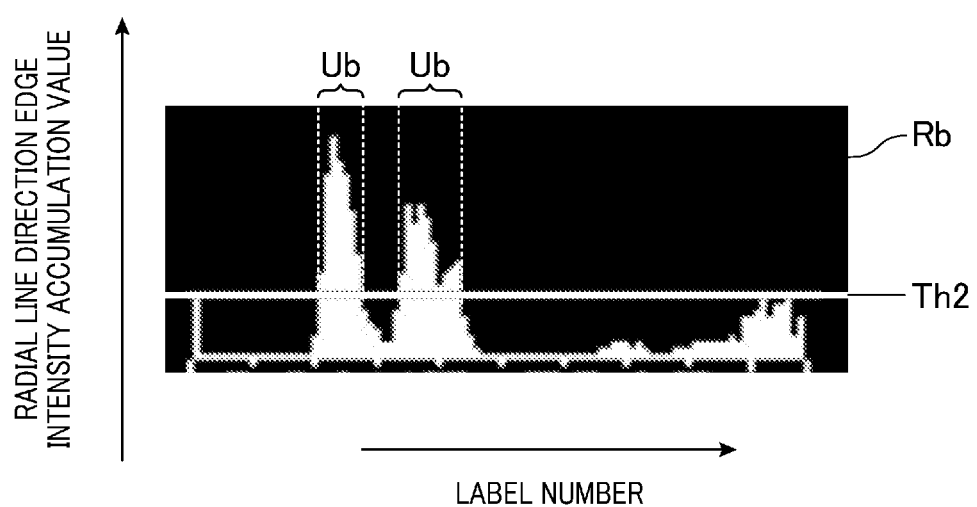

FIG.15
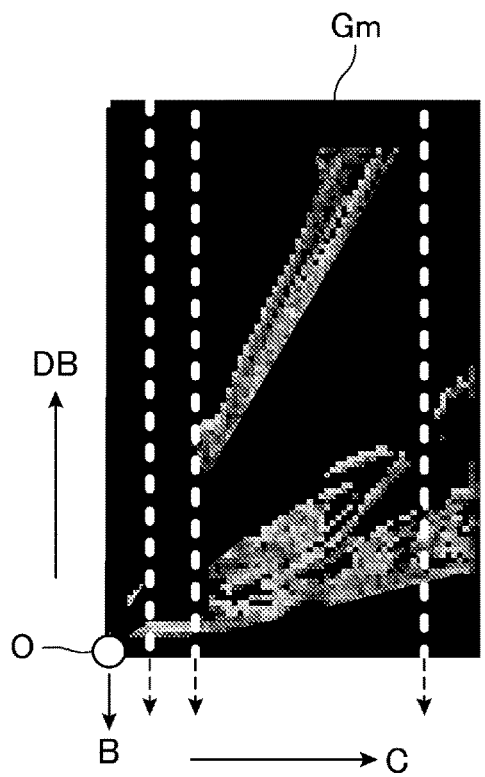
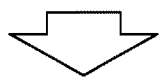
CALCULATE ACCUMULATION VALUE
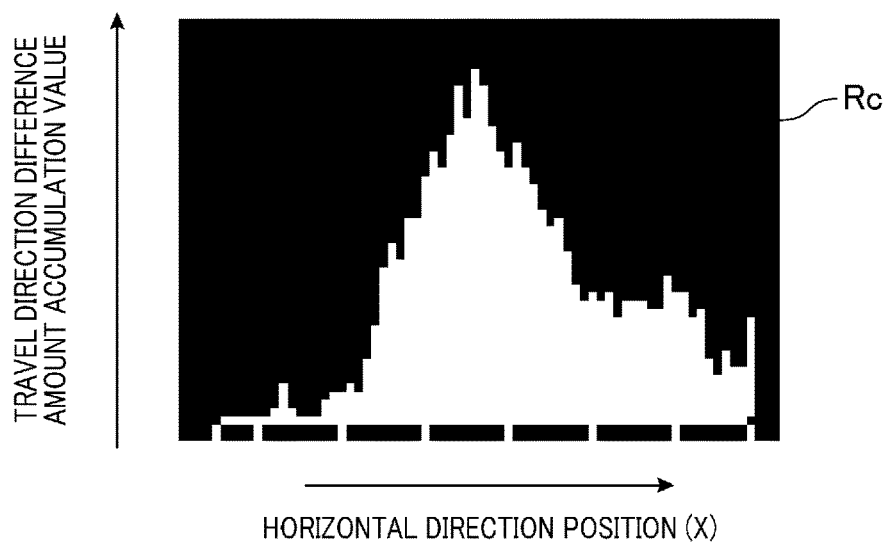

FIG.20
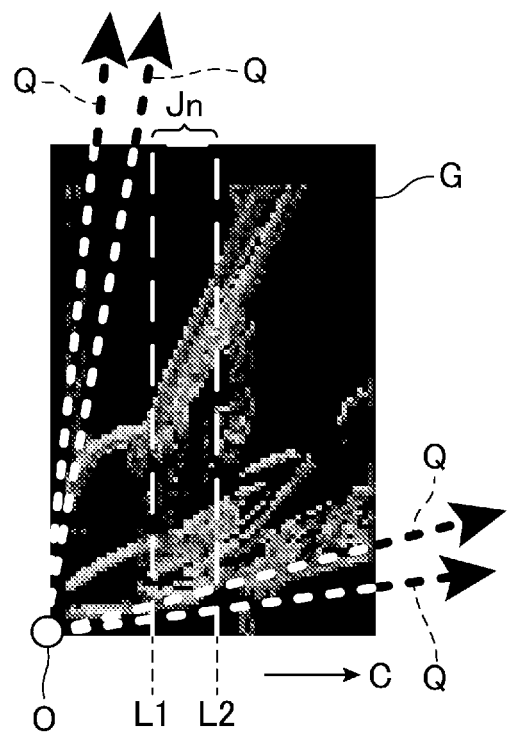
CALCULATE ACCUMULATION VALUE
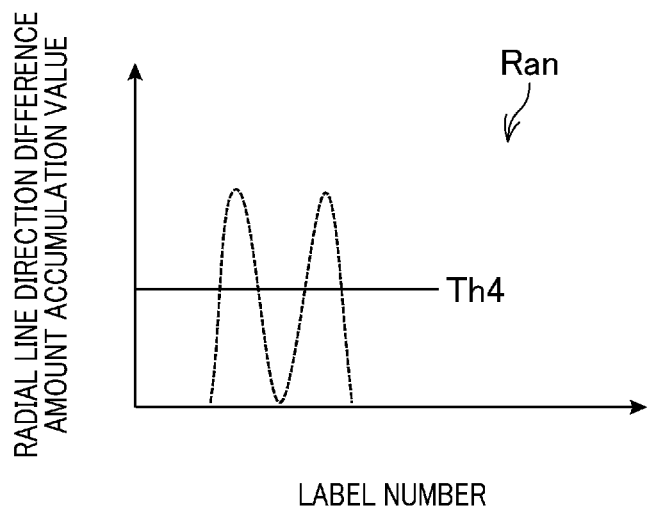

FIG.21
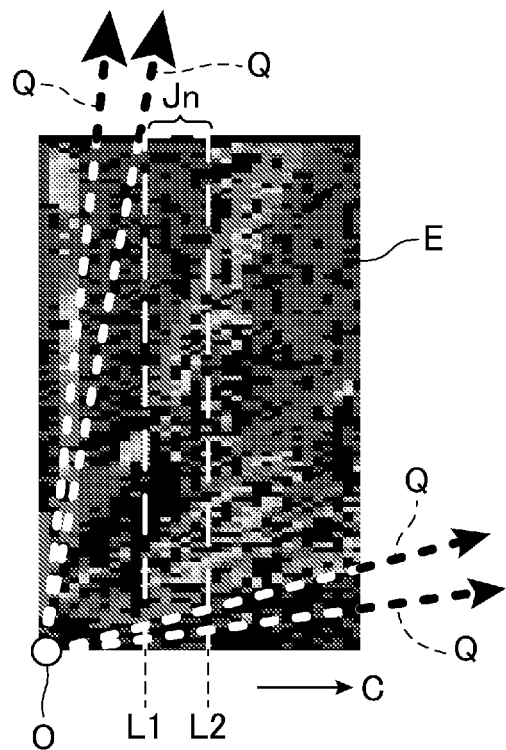
CALCULATE ACCUMULATION VALUE
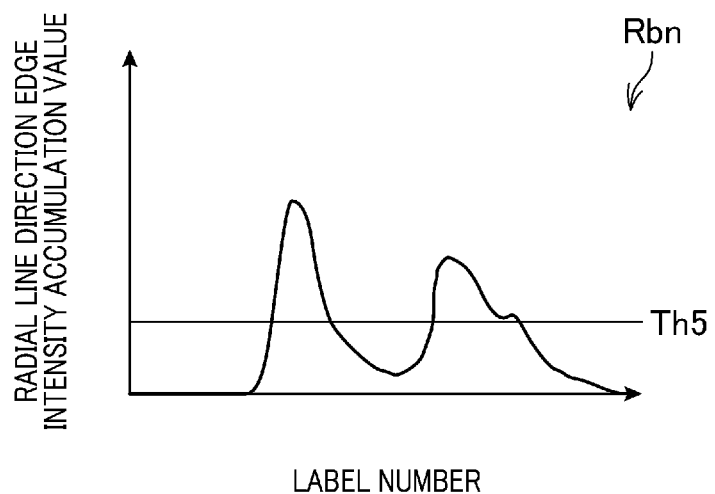

FIG.22
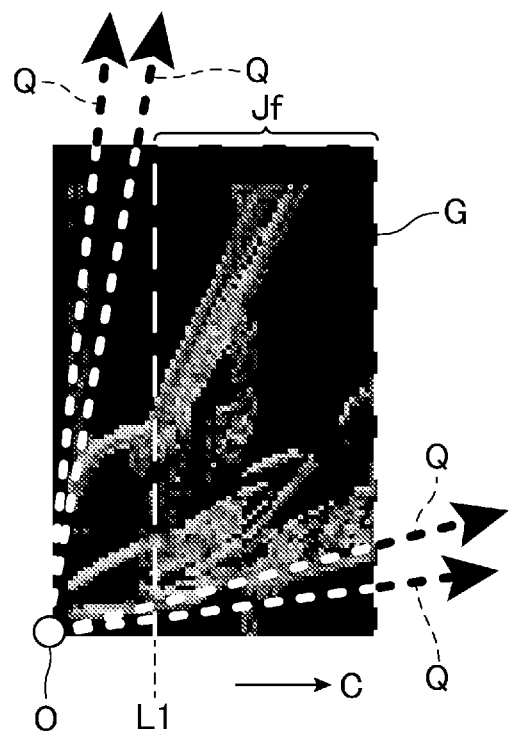
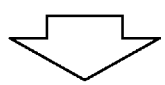 CALCULATE ACCUMULATION VALUE
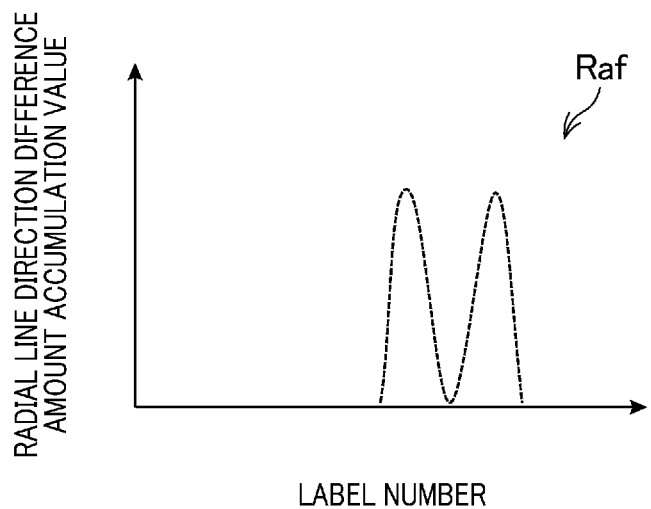

FIG.23
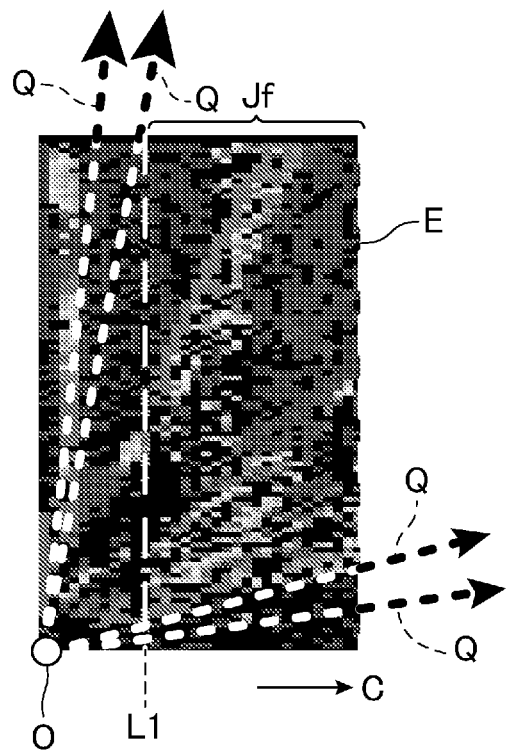
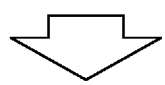
CALCULATE ACCUMULATION VALUE
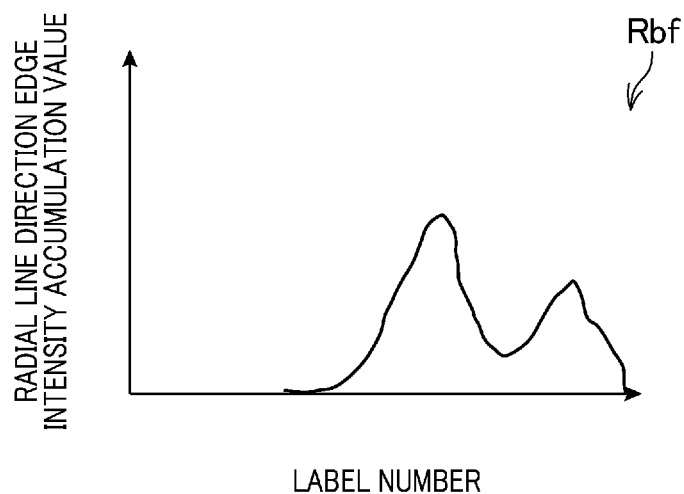
LABEL NUMBER

SOLID OBJECT DETECTION DEVICE AND SOLID OBJECT DETECTION METHOD

INCORPORATION BY REFERENCE

The present application claims priority under 35 U.S.C. § 119 to Japanese Patent Application No. 2019-090116 filed on May 10, 2019. The content of the application is incorporated herein by reference in its entirety.

BACKGROUND OF THE INVENTION

Field of the Invention

The present invention relates to a solid object detection device and a solid object detection method.

Description of the Related Art

A technique has been known which detects a solid object such as another vehicle around a vehicle based on a difference between overhead view images (also referred to as bird's eye view image) at different timings (see Japanese Patent Laid-open No. 2008-227646 and International Publication No. WO 2014/017521, for example). As in Japanese Patent Laid-open No. 2008-227646, such a technique is applied to a parking assistance system or the like that detects a solid object such as another vehicle in a periphery in parking of a vehicle as an obstacle and gives an alarm.

SUMMARY OF THE INVENTION

A shadow of a structure such as a building, a sign, or a traffic signal often emerges on a road, and relative movement of this shadow is observed from a traveling vehicle. There has been a problem that in a case where such a shadow is present between the traveling vehicle and a solid object around that, detection precision of a solid object is impaired.

An object of one aspect of the present invention is to provide a solid object detection device and a solid object detection method that may improve detection precision of a solid object present around a traveling vehicle.

One aspect of the present invention provides a solid object detection device including: an overhead view transformation processing unit that transforms a first photographed image and a second photographed image which are photographed by a camera at different timings in travel of a vehicle into a first overhead view image and a second overhead view image, respectively; a subtracted image generation unit that generates a subtracted image between the first overhead view image and the second overhead view image whose photographing positions are aligned with each other; a solid object position specification unit that specifies a position of a solid object present around the vehicle based on the subtracted image; and a masked subtracted image generation unit that generates a masked subtracted image in which a region other than a solid object candidate region as a candidate where the solid object appears in the subtracted image is masked, in which the solid object position specification unit specifies a position of the solid object in the subtracted image based on the masked subtracted image.

In one aspect of the present invention, in the solid object detection device, the solid object position specification unit may include a lateral location line specification unit that specifies a near grounding line of the solid object in the subtracted image based on a position on a horizontal axis in which a travel direction difference amount accumulation value exceeds a third threshold value in a masked difference histogram, which has a horizontal direction orthogonal to a travel direction of the vehicle as a horizontal axis and has the travel direction difference amount accumulation value resulting from accumulation of a pixel value of each pixel of the masked subtracted image along the travel direction as a vertical axis, and may specify the position of the solid object in the subtracted image based on the near grounding line specified by the lateral location line specification unit.

In one aspect of the present invention, in the solid object detection device, the lateral location line specification unit may specify a closest range to the photographing position in a range in which the travel direction difference amount accumulation value successively exceeds the third threshold value on the horizontal axis of the masked difference histogram and may specify a spot in immediate front of the range, as seen from the photographing position, as a position of the near grounding line.

In one aspect of the present invention, in the solid object detection device, the lateral location line specification unit may specify a far grounding line of the solid object in the subtracted image based on a width of the solid object and the near grounding line.

In one aspect of the present invention, in the solid object detection device, the masked subtracted image generation unit may specify a radial line whose radial line direction difference amount accumulation value is a first threshold value or smaller in a difference histogram, which has each of plural radial lines extending from the photographing position in the subtracted image as a horizontal axis and has the radial line direction difference amount accumulation value resulting from accumulation of each pixel value of the subtracted image along the radial line as a vertical axis, and may mask a region that corresponds to the radial line in the subtracted image.

In one aspect of the present invention, in the solid object detection device, the masked subtracted image generation unit may specify a radial line whose radial line direction edge intensity accumulation value is a second threshold value or smaller in an edge intensity histogram, which has each of plural radial lines extending from the photographing position in an edge image which extracts a contour component of the solid object from an image corresponding to a photographed image being photographed latest between the first overhead view image and the second overhead view image as a horizontal axis and has the radial line direction edge intensity accumulation value resulting from accumulation of each pixel value of the edge image along the radial line as a vertical axis, and may mask a region that corresponds to the radial line in the subtracted image.

In one aspect of the present invention, in the solid object detection device, the solid object position specification unit may include a solid object region specification unit that specifies a first region in which the solid object is positioned in the near grounding line and a second region in which the solid object is positioned in the far grounding line based on an intersection point between a radial line which extends from the photographing position in the subtracted image and includes a perpendicular direction contour line of the solid object and each of the near grounding line and the far grounding line and that specifies a solid object region in which the solid object appears in the subtracted image based on a range in which the first region and the second region overlap with each other.

In one aspect of the present invention, in the solid object detection device, the solid object region specification unit may specify a radial line whose radial line direction difference amount accumulation value is a fourth threshold value or greater in a difference histogram, which has each of plural radial lines extending from the photographing position in the subtracted image as a horizontal axis and has the radial line direction difference amount accumulation value resulting from accumulation of each pixel value of the subtracted image along the radial line as a vertical axis, as the radial line which includes the perpendicular direction contour line of the solid object.

In one aspect of the present invention, in the solid object detection device, the solid object region specification unit may specify a radial line whose radial line direction edge intensity accumulation value is a fifth threshold value or greater in an edge intensity histogram, which has each of plural radial lines extending from the photographing position in an edge image which extracts a contour component of the solid object from an image corresponding to a photographed image being photographed latest between the first overhead view image and the second overhead view image as a horizontal axis and has the radial line direction edge intensity accumulation value resulting from accumulation of each pixel value of the edge image along the radial line as a vertical axis, as the radial line which includes the perpendicular direction contour line of the solid object.

In one aspect of the present invention, in the solid object detection device, the solid object region specification unit may obtain the radial line based on the subtracted image in which a region other than a region interposed between the near grounding line and the far grounding line is masked, specify the first region based on an intersection point between the radial line and the near grounding line, may obtain the radial line based on the subtracted image in which a region other than a far region which is farther than the near grounding line when seen from the photographing position is masked, and specify the second region based on an intersection point between the radial line and the far grounding line.

One aspect of the present invention provides a solid object detection method including: a first step of transforming a first photographed image and a second photographed image which are photographed by a camera at different timings in travel of a vehicle into a first overhead view image and a second overhead view image, respectively; a second step of generating a subtracted image between the first overhead view image and the second overhead view image whose photographing positions are aligned with each other; a third step of generating a masked subtracted image in which a region other than a solid object candidate region as a candidate where the solid object appears in the subtracted image is masked; and a fourth step of specifying a position of the solid object in the subtracted image based on the masked subtracted image.

One aspect of the present invention may improve detection precision of a solid object present around a traveling vehicle.

BRIEF DESCRIPTION OF DRAWINGS

FIG. 5 is an explanatory diagram of a subtracted image generation action;

FIG. 7 is an explanatory diagram of distortion of a perpendicular direction contour line due to projective transformation;

FIG. 10 is an explanatory diagram of a difference histogram;

FIG. 11 is an explanatory diagram of an edge intensity histogram;

FIG. 15 is an explanatory diagram of a masked difference histogram;

FIG. 20 is an explanatory diagram of a difference close region histogram;

FIG. 21 is an explanatory diagram of an edge intensity close region histogram;

FIG. 22 is an explanatory diagram of a difference far region histogram;

FIG. 23 is an explanatory diagram of an edge intensity far region histogram;

DETAILED DESCRIPTION OF THE PREFERRED EMBODIMENT

An embodiment of the present invention will hereinafter be described with reference to drawings.

Figure 1:
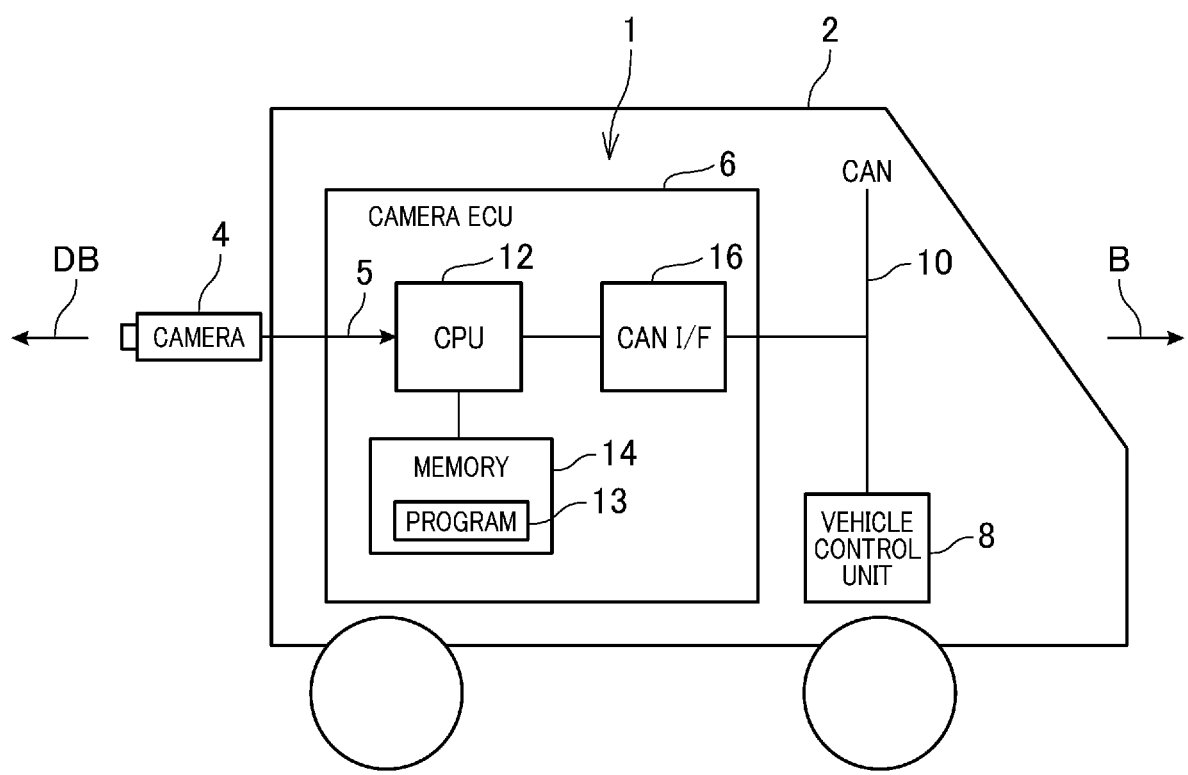
FIG. 1 is a diagram that illustrates a configuration of an in-vehicle system according to an embodiment of the present invention.

FIG. 1 is a diagram that illustrates a configuration of an in-vehicle system 1 according to this embodiment.

The in-vehicle system 1 is a system mounted on a vehicle 2 and includes a camera 4, a camera ECU 6, a vehicle control unit 8, and a CAN 10 as one kind of in-vehicle network which connects the camera ECU 6 and the vehicle control unit 8 together.

The camera 4 is a rear camera that is provided in a rear portion of the vehicle 2 and photographs a rear area DB of the vehicle 2 and outputs a camera picture 5 obtained by photographing to the camera ECU 6. The camera ECU 6 in this embodiment is a device that functions as an other vehicle detection device (solid object detection device) that detects a position of another vehicle A (FIG. 3) as one example of a solid object based on the camera picture 5 and transmits position information of the other vehicle A to the vehicle control unit 8 through the CAN 10 and includes a function of controlling a photographing action by the camera 4 and a function of conducting appropriate signal processing for the camera picture 5.

The vehicle control unit 8 is a unit that includes for example, CPU, ROM and RAM, and executes a control program stored in ROM or the like to execute various kinds of control related to travel of the vehicle 2 and has a function of controlling units of the vehicle 2 such as a steering mechanism and a driving mechanism for such control.

The vehicle control unit 8 includes a function of driving and controlling the vehicle 2 instead of a driving operation by a driver (so-called autonomous driving control function), consecutively acquires the position of a solid object present around the vehicle 2, and performs driving and controlling so as to secure a suitable distance from the solid object in travel of the vehicle 2. For example, in a case where the other vehicle A as one example of a solid object may approach the vehicle 2 in changing a lane, merging, diverging, or the like, the vehicle control unit 8 acquires the position of the other vehicle A and performs driving and controlling so as to secure a suitable inter-vehicle distance from the other vehicle A based on the position of the other vehicle A.

Note that the vehicle control unit 8 may include a driving assistance function of assisting the driving operation by the driver instead of the autonomous driving control function or in addition to the autonomous driving control function. The driving assistance function is for assisting the driving operation by the driver by consecutively acquiring the position of a solid object present around the vehicle 2 in travel of the vehicle 2, guiding the driver about the solid object, and issuing various kinds of alarms based on the position of the solid object to the driver.

Here, the above camera ECU 6 is a so-called computer that includes a CPU 12 as one example of a processor, a memory 14 such as a ROM or a RAM which stores various kinds of information such as a program 13, and a CAN I/F 16 as a communication module which communicates with the vehicle control unit 8 through the CAN 10. The camera ECU 6 of this embodiment is configured to function as the above-described other vehicle detection device by execution of a program stored in the memory 14 by the CPU 12.

Figure 2:
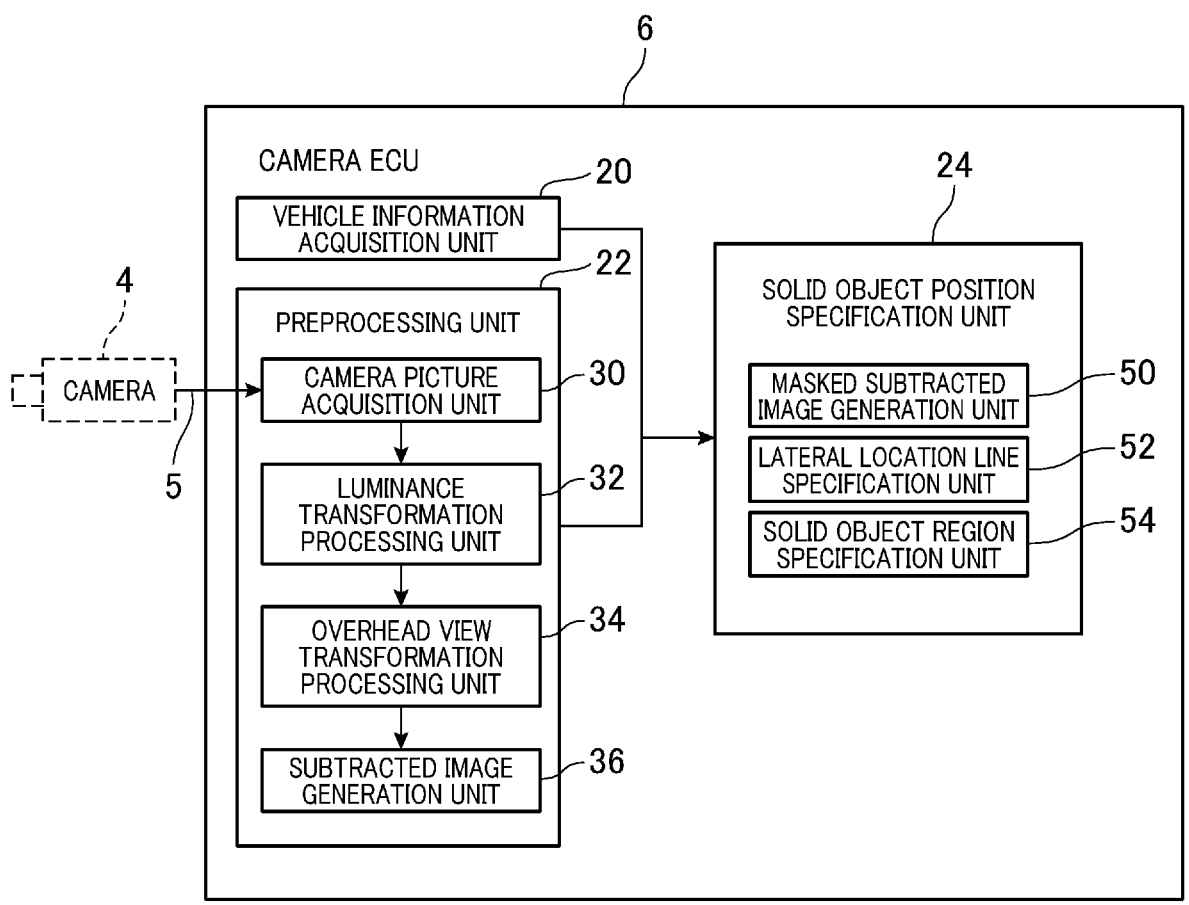
FIG. 2 is a diagram that illustrates a functional configuration of a camera ECU.

FIG. 2 is a diagram that illustrates a functional configuration of the camera ECU 6.

The camera ECU 6 of this embodiment acquires a first photographed image and a second photographed image, which are photographed at different timings, from the camera picture 5 and detects the position of the other vehicle A based on a subtracted image G as the difference between a first overhead view image F1 and a second overhead view image F2, which result from overhead view transformation of the first and second photographed images. For such a detection action, as illustrated in FIG. 2, the camera ECU 6 includes a vehicle information acquisition unit 20, a preprocessing unit 22, and a solid object position specification unit 24.

The vehicle information acquisition unit 20 acquires vehicle information from the vehicle control unit 8. This vehicle information includes at least a traveling velocity of the vehicle 2.

The preprocessing unit 22 executes processing for obtaining the subtracted image G from the camera picture 5 and includes a camera picture acquisition unit 30, a luminance transformation processing unit 32, an overhead view transformation processing unit 34, and a subtracted image generation unit 36.

The camera picture acquisition unit 30 controls the camera 4, thereby continues photographing by the camera 4 through prescribed time or longer, and acquires the camera picture 5 obtained by the photographing.

The luminance transformation processing unit 32 transforms each frame (photographed image) that configures the camera picture 5 into a luminance image. Each frame corresponds to the photographed image which is a still image, and the luminance image is an image in which each pixel value of the photographed image is transformed into the luminance value of the pixel.

The overhead view transformation processing unit 34 transforms each luminance image into an overhead view image. The overhead view image is an image as seen from a virtual viewpoint set above the vehicle 2 in a direct downward direction and is generated by projective transformation (also referred to as viewpoint transformation) of the luminance image.

The subtracted image generation unit 36 extracts the first overhead view image F1 and the second overhead view image F2 (see FIG. 5) obtained from two images, which are the first photographed image and the second photographed image whose photographing timings are different, from the overhead view images that are sequentially generated by the overhead view transformation processing unit 34 and generates the subtracted image G between the first overhead view image F1 and the second overhead view image F2. The subtracted image G is an image in which the pixel value (luminance value) of each pixel of a first photographed image E1 is transformed into the difference from the pixel value (luminance value) of the pixel of a second photographed image E2, which corresponds to the above pixel, and the pixel value of each of the pixels is binarized by a prescribed threshold value. In generation of the subtracted image G, the subtracted image generation unit 36 generates the subtracted image G by calculating the difference amount in the pixel value of each pixel between the first overhead view image F1 and the second overhead view image F2 in a state where photographing positions O of the first overhead view image F1 and the second overhead view image F2 are aligned while the first overhead view image F1 is used as a reference.

The solid object position specification unit 24 specifies the position of the other vehicle A as one example of a solid object based on the subtracted image G and includes a masked subtracted image generation unit 50, a lateral location line specification unit 52, and a solid object region specification unit 54.

The masked subtracted image generation unit 50 generates a masked subtracted image Gm (see FIG. 13) in which a region other than a candidate region where the other vehicle A appears (hereinafter referred to as "other vehicle candidate region 60") is masked in the subtracted image G.

The lateral location line specification unit 52 specifies a near grounding line L1 and a far grounding line L2 of an other vehicle region H in the subtracted image G based on the masked subtracted image Gm. The other vehicle region H is one example of a region where the other vehicle A as a solid object appears (solid object region) in the subtracted image G.

Figure 3:
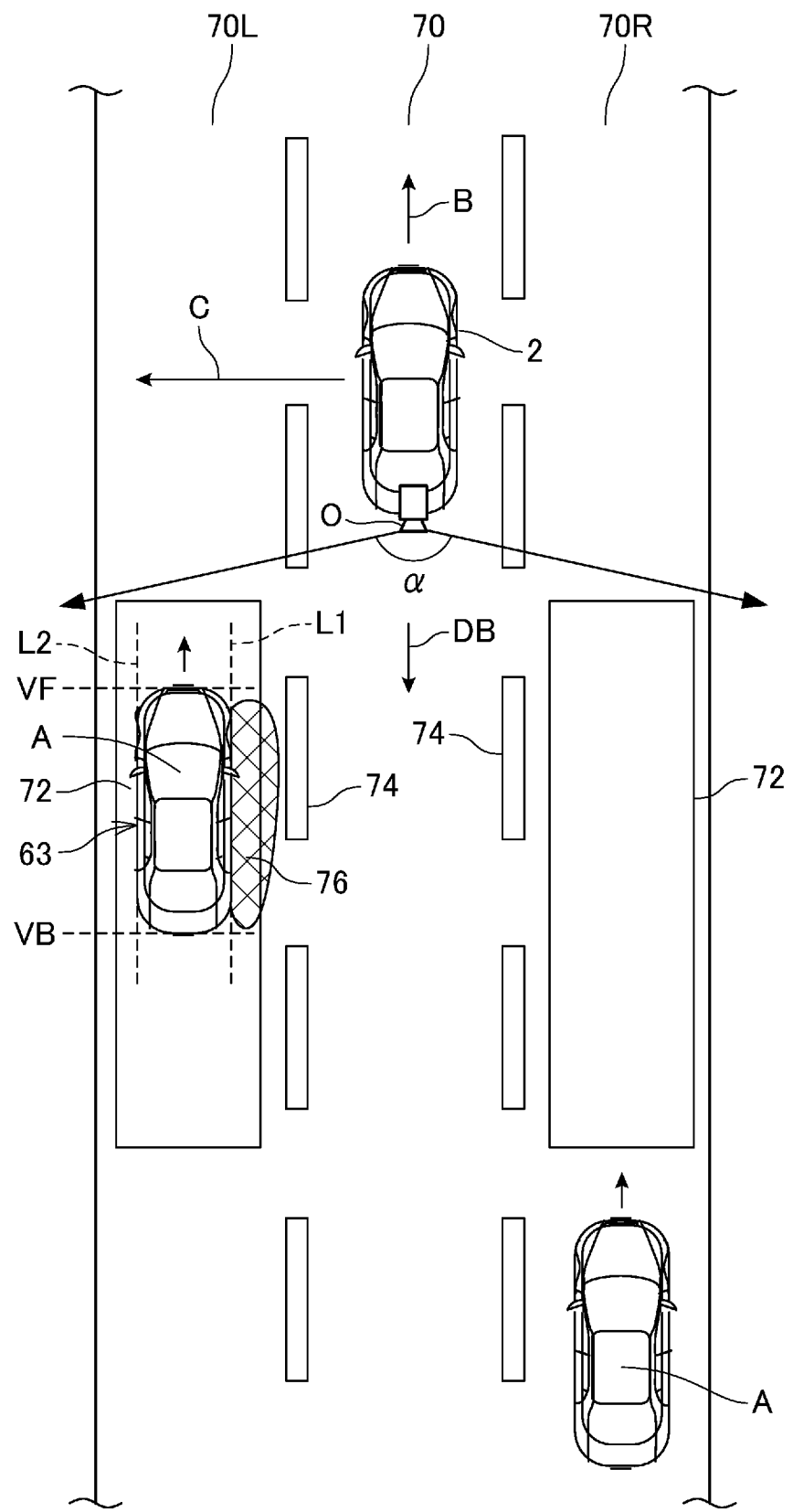
FIG. 3 is a diagram that illustrates the positional relationship between a vehicle and other vehicles in the embodiment.

The lateral location line is a line on which the other vehicle A, which is present on another lane neighboring a lane on which the vehicle 2 is traveling, contacts with a ground and corresponds to a contour line 63 (see FIG. 3) of the other vehicle A in a planar view. In this embodiment, as illustrated in FIG. 3, the near grounding line L1 indicates a closer line to the vehicle 2 between the contour lines 63 on both of left and right sides of the other vehicle A, and the far grounding line L2 indicates a farther line from the vehicle 2. The near grounding line L1 and the far grounding line L2 are set in the subtracted image G, and the position of the other vehicle region H in a horizontal direction C orthogonal to a travel direction B is thereby specified.

The solid object region specification unit 54 specifies the respective positions of a front end VF and rear end VB (see FIG. 3) of the other vehicle A in each of the near grounding line L1 and the far grounding line L2 based on the subtracted image G and detects the other vehicle region H in the subtracted image G based on the near grounding line L1, the far grounding line L2, and the front end VF and rear end VB of the other vehicle A. However, in a case where plural other vehicles A are traveling in column, there is a possibility that two or more other vehicles A are included in the other vehicle region H. Even in a case where two or more other vehicles A are included in the other vehicle region H, the solid object region specification unit 54 of this embodiment specifies, for each individual other vehicle A, an individual other vehicle region K where the other vehicle A is positioned in the subtracted image G.

The solid object position specification unit 24 specifies the position of the other vehicle A in a real space based on the position of the individual other vehicle region K in the subtracted image G by using an appropriate method, which is publicly known or well-known, and consecutively transmits the specified position to the vehicle control unit 8.

Next, a detection action of the other vehicle A by the camera ECU 6 will be described.

Note that in the following description, as illustrated in FIG. 3, a description will be made about the detection action in a case where other neighboring lanes 70R and 70L are present on both sides of a lane 70 on which the vehicle 2 is traveling and the other vehicles A are traveling on the lanes 70R and 70L in the same direction as the vehicle 2, as an example. In this case, it is assumed that both of the other vehicles A are positioned in the rear area DB of the vehicle 2 and are positioned in the range of an angle of view a of the camera 4. In FIG. 3, a region indicated by rectangular lines indicates a detection region 72 for detecting presence of the other vehicle A in autonomous driving control or driving assistance by the vehicle control unit 8.

Figure 4:
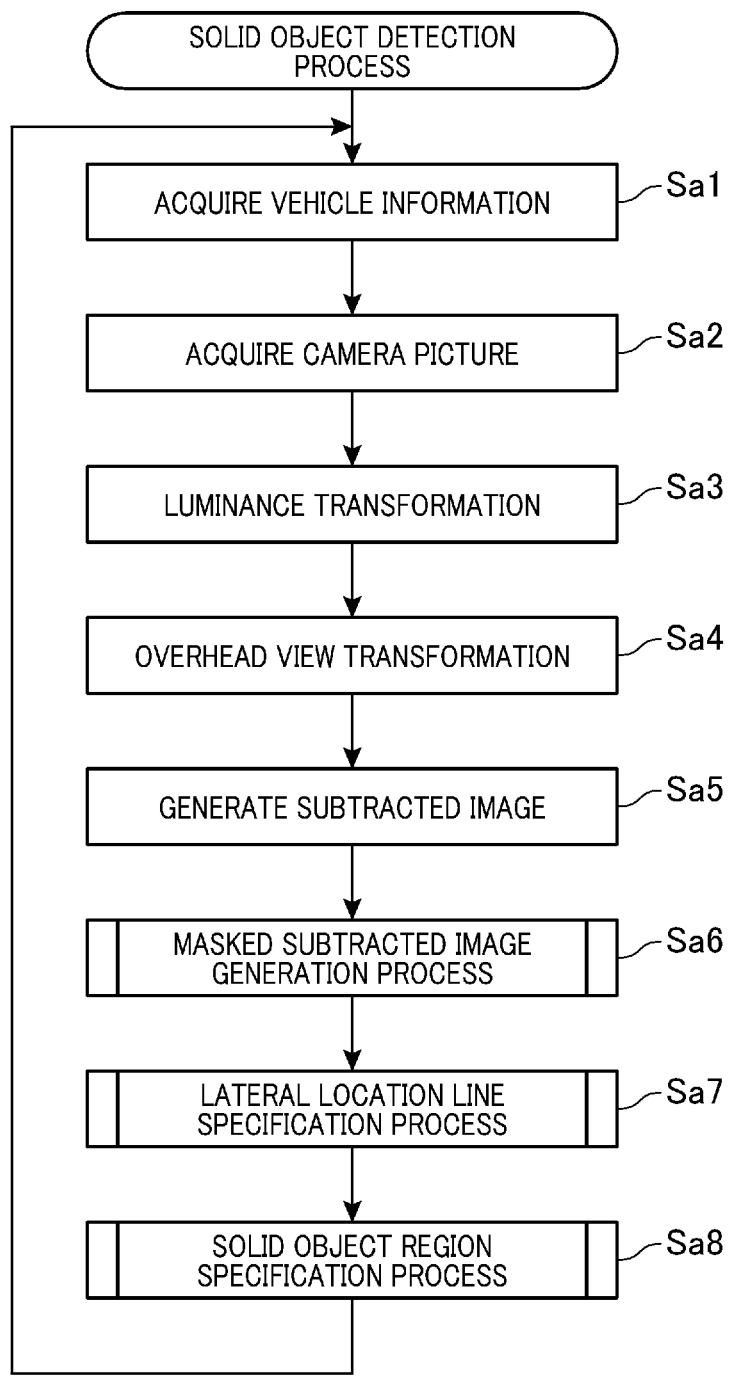
FIG. 4 is a flowchart of a solid object detection process.

FIG. 4 is a flowchart of a solid object detection process.

The solid object detection process is continuously and repeatedly executed by the camera ECU 6 in order to detect presence of the other vehicle A around the vehicle 2 at least while the vehicle 2 is traveling.

As illustrated in FIG. 4, in the camera ECU 6, the vehicle information acquisition unit 20 first acquires the vehicle information that includes at least the traveling velocity of the vehicle 2 (step Sa1), the camera picture acquisition unit 30 acquires the camera picture 5 from the camera 4 (step Sa2). Next, the luminance transformation processing unit 32 sequentially transforms each frame (photographed image) of the camera picture 5 into the luminance image (step Sa3), and the overhead view transformation processing unit 34 sequentially generates the overhead view image F based on the luminance image (step Sa4).

Then, the subtracted image generation unit 36 extracts the first overhead view image F1 and the second overhead view image F2 obtained from two images, which are the first photographed image and the second photographed image whose photographing timings are different, from the overhead view images that are sequentially generated by the overhead view transformation processing unit 34 and generates the subtracted image G between the first overhead view image F1 and the second overhead view image F2 (step Sa5).

FIG. 5 is an explanatory diagram of a subtracted image generation action.

Note that in the following, a description will be made on an assumption that the photographed image that is photographed latest is used as the first photographed image, and the photographed image that is photographed earlier than that is used as the second photographed image.

Because the photographing positions O of the first photographed image and the second photographed image are displaced from each other in the travel direction B, as illustrated in FIG. 5, a displacement due to movement of the vehicle 2 also occurs between the photographing positions O of the first overhead view image F1 and the second overhead view image F2. In order to generate the subtracted image G while correcting the displacement between the photographing positions O, the subtracted image generation unit 36 generates the subtracted image G between the first overhead view image F1 and the second overhead view image F2 in a state where the photographing positions O of both of the first overhead view image F1 and the second overhead view image F2 are aligned while either one of those (the first overhead view image F1 in FIG. 5) is used as a reference.

Specifically, the subtracted image generation unit 36 calculates a travel distance of the vehicle 2 based on the traveling velocity of the vehicle 2 and a time difference to between the photographing timings of the first photographed image and the second photographed image. Then, the subtracted image generation unit 36 displaces each of the pixels of either one of the first overhead view image F1 and the second overhead view image F2 (in FIG. 5, the second overhead view image F2 whose photographing timing is earlier) in the travel direction B for the number of pixels that corresponds to the travel distance. This provides a state where the photographing positions O of the first overhead view image F1 and the second overhead view image F2 are aligned while the other of the first overhead view image F1 and the second overhead view image F2 is used as the reference.

In a case where an arbitrary stationary object such as a white line 74 as one kind of a road surface marking appears in each of the first overhead view image F1 and the second overhead view image F2, the photographing positions O of both of those are aligned, and the positions in which the stationary object appears are aligned as illustrated in FIG. 5.

On the other hand, in a case where the other vehicle A as a moving object appears in each of the first overhead view image F1 and the second overhead view image F2, the photographing positions O of both of those are aligned, and a displacement occurs between the positions of the other vehicle A that appears in the first overhead view image F1 and the second overhead view image F2 as illustrated in FIG. 5.

Thus, in the subtracted image G that indicates the difference between both of those, the pixel values (difference amount) of the region where a stationary object which is a road surface marking (such as the white line 74) appears become small, and the pixel values (difference amount) of the region where the other vehicle A appears become relatively large. Consequently, an image from which a stationary object is removed may be obtained by suitably setting a threshold value of the luminance value used for binarization of the subtracted image G, and it becomes possible to extract the other vehicle region H based on the distribution of the pixel values in the subtracted image G and to specify the position of the other vehicle A (particularly, the near ground-ing line L1).

However, as illustrated in above-mentioned FIG. 3, in a case where a shadow 76 is produced by an arbitrary moving object such as the vehicle 2 or the other vehicle A between the vehicle 2 and the other vehicle A, the pixel values of the region that corresponds to the shadow 76 increase in the subtracted image G. Thus, when a region where the pixel values are large is simply extracted as the other vehicle region H in the subtracted image G, the region that corresponds to the shadow 76 is included in the other vehicle region H, and precision is impaired.

Accordingly, in the camera ECU 6, when the solid object region specification unit 54 specifies the other vehicle region H based on the subtracted image G, the masked subtracted image generation unit 50 first executes a masked subtracted image generation process as illustrated in above-mentioned FIG. 4 (step Sa6) and thereby generates the above masked subtracted image Gm, in which a region which corresponds to noise such as the shadow 76 in the subtracted image G, in other words, the region other than the above other vehicle candidate region 60 as a candidate region where the other vehicle A appears is masked as the masking region 62. Then, the lateral location line specification unit 52 executes a lateral location line specification process (step Sa1) and specifies the near grounding line L1 and the far grounding line L2 as the position of the other vehicle A based on the masked subtracted image Gm in which an influence of noise is removed by masking.

Figure 6:
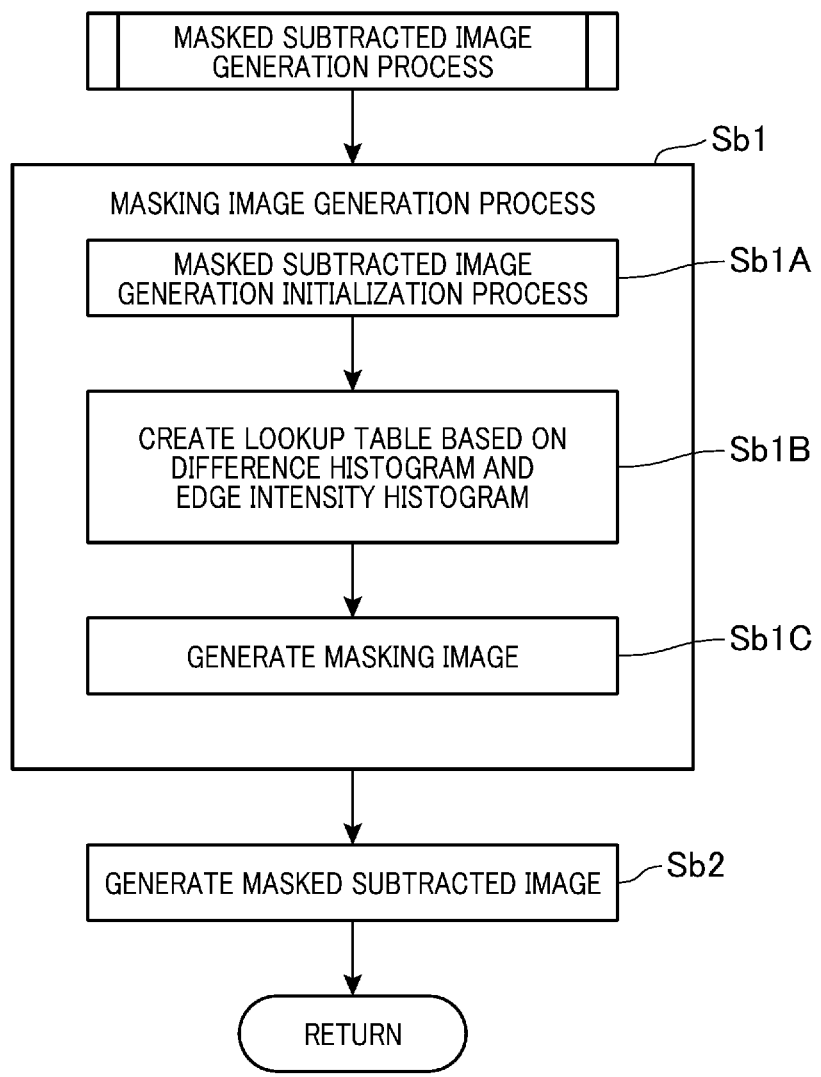
FIG. 6 is a flowchart of a masking image generation process.

FIG. 6 is a flowchart of a masking image generation process.

In the masking image generation process, the masked subtracted image generation unit 50 first generates a masking image 90 for masking the masking region 62 (step Sb1). As described above, the masking region 62 is the region other than the other vehicle candidate region 60 in the subtracted image G, and the other vehicle candidate region 60 is specified based on a perpendicular direction contour line P of the other vehicle A that appears in the subtracted image G.

FIG. 7 is an explanatory diagram of distortion of the perpendicular direction contour line P due to projective transformation.

As illustrated in FIG. 7, the perpendicular direction contour line P is each of lines that extend in the perpendicular direction (the vertical direction with respect to the ground) among the contour lines 63 of the other vehicle A that appear in a photographed image M (the frame of the camera picture 5), the contour lines of vehicle body parts (such as doors) of the other vehicle A, the contour lines of a pattern drawn on the other vehicle A, and so forth. So-called distortion occurs to those perpendicular direction contour lines P due to projective transformation (viewpoint transformation) of the photographed image M, and those are transformed into line segments on radial lines Q that extend from the photographing position O of the camera 4 in the overhead view image F. That is, in the overhead view image F, because the region of the radial lines Q including the perpendicular direction contour lines P (the hatched region in FIG. 7) indicates a region where the other vehicle A is present, such a region becomes the other vehicle candidate region 60.

Note that the directions of the radial lines Q including the perpendicular direction contour lines P are also referred to as directions in which a solid object is distorted due to projective transformation (viewpoint transformation).

Also in the subtracted image G as the difference between two overhead view images F, similarly to the overhead view image F, the perpendicular direction contour line P is a line segment on the radial line Q. In the subtracted image G, the pixel value (difference amount) of each pixel of the radial lines Q including the perpendicular direction contour lines P becomes larger than the other pixels. Consequently, the other vehicle candidate region 60 may be extracted from the subtracted image G based on the pixel values in the subtracted image G.

In this embodiment, extraction of the other vehicle candidate region 60 is efficiently performed by using a label image 91 and a lookup table 92.

Figure 8:
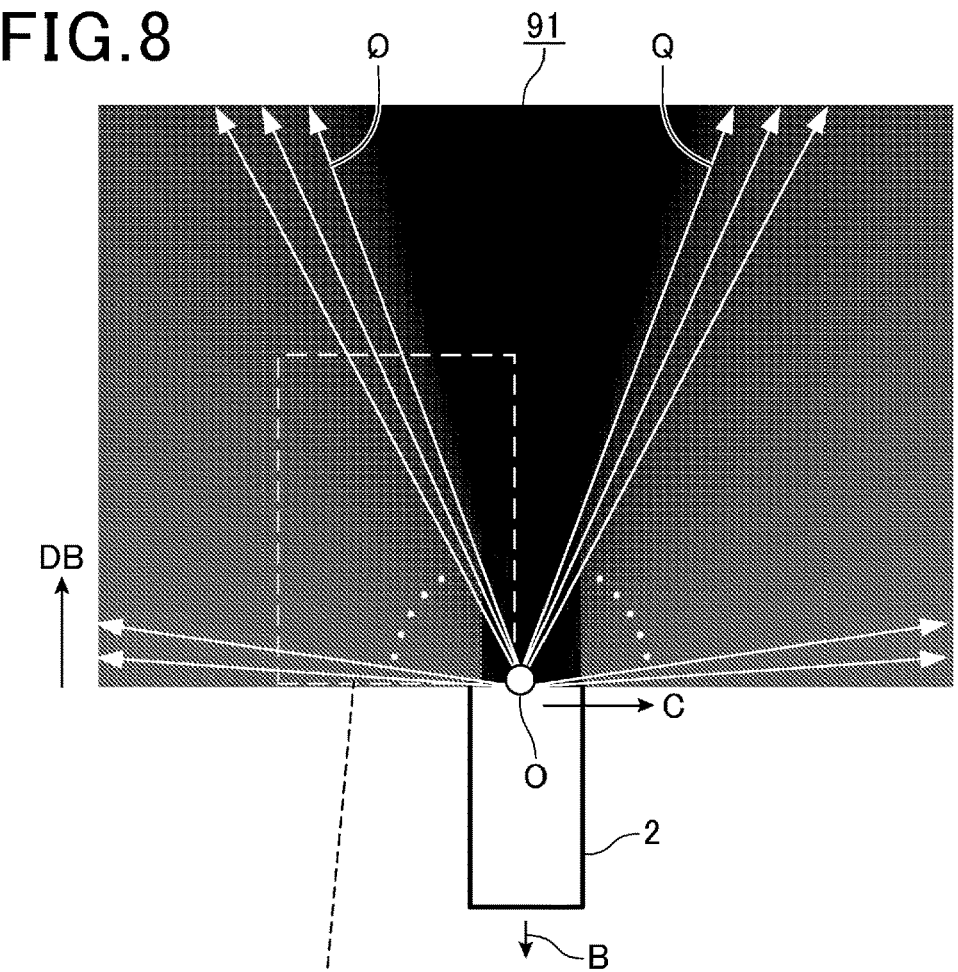
FIG. 8 is a diagram that schematically illustrates a label image.

FIG. 8 is a diagram that schematically illustrates the label image 91.

The label image 91 is an image of plural radial lines Q that radially extend from the photographing position O at equivalent intervals and are identified by respective label numbers, and each of the radial lines Q is a candidate of the radial line Q that includes the perpendicular direction contour line P in the subtracted image G. In this embodiment, the label image 91 includes 100 radial lines Q whose label numbers are "1" to "100".

Such a label image 91 has the number of pixels that corresponds to the subtracted image G, and as illustrated in FIG. 8, the label number (any of "1" to "100") of the radial line Q is associated with each pixel that configures the same radial line Q.

Figure 9:
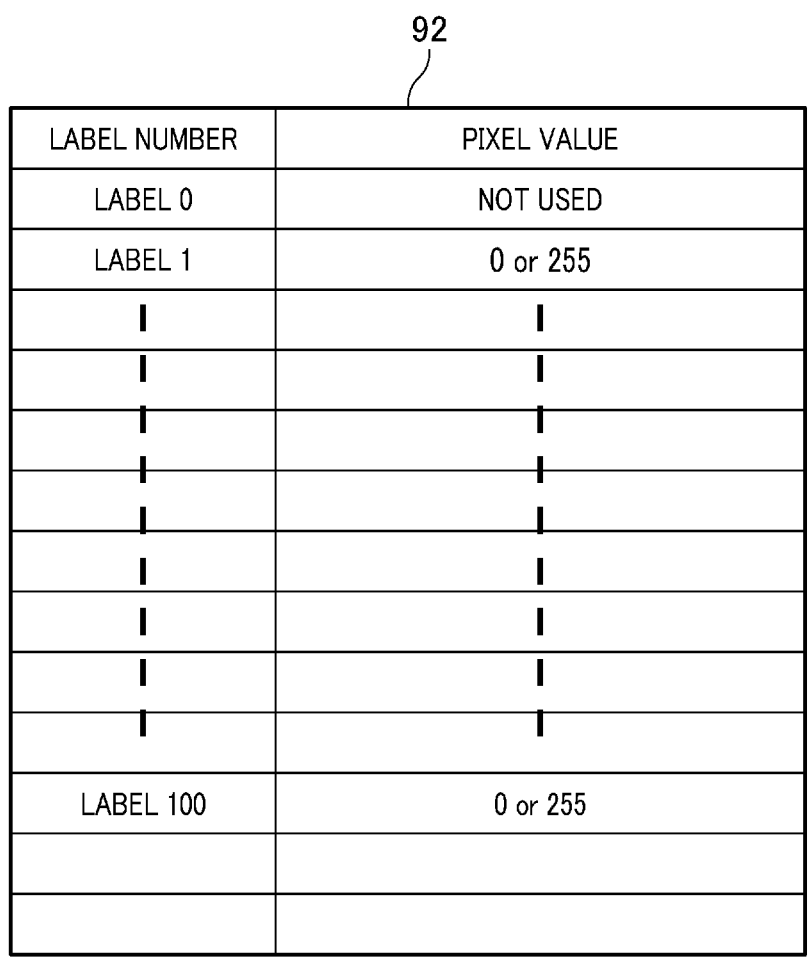
FIG. 9 is a diagram that schematically illustrates a lookup table.

FIG. 9 is a diagram that schematically illustrates the lookup table 92.

The lookup table 92 designates either one of pixel values of "255" that corresponds to non-masking (white) and "0" that corresponds to masking (black) for each pixel of the label image 91. The pixel value of each pixel of the label image 91 is set based on designation by the lookup table 92, and the masking image 90 is thereby obtained in which the pixels are in a non-masked state (white) or a masked state (black).

As illustrated in FIG. 9, in the lookup table 92, the pixel value of the radial line Q is designated for each of the label numbers of the radial lines Q, and the pixel value is decided based on the pixel value of each of the radial lines Q in the subtracted image G.

Returning to above-mentioned FIG. 6, in step Sb1, in order to generate such a masking image 90, the masked subtracted image generation unit 50 first performs initialization by setting all of the pixel values of the above label image 91 to "255" (non-masked state) or "0" (masked state) (step Sb1A).

Next, the masked subtracted image generation unit 50 creates the above lookup table 92 based on the pixel value of each of the radial lines Q in the subtracted image G (step Sb1B). Specifically, the masked subtracted image generation unit 50 decides a flag ("0" or "255") that indicates the luminance value of each pixel of each of the radial lines Q in the lookup table 92 based on a difference histogram Ra and an edge intensity histogram Rb.

FIG. 10 is an explanatory diagram of the difference histogram Ra.

As illustrated in FIG. 10, the difference histogram Ra is a graph that has the label number as the horizontal axis and has the value, which results from accumulation of presence and absence of the pixel value for each of the radial lines Q in the subtracted image G, (hereinafter referred to as "radial line direction difference amount accumulation value") as the vertical axis. Because the radial line direction difference amount accumulation value becomes large when the radial line Q includes the perpendicular direction contour line P, the radial lines Q whose radial line direction difference amount accumulation values exceed a prescribed first threshold value Th1 are specified in the difference histogram Ra, and a range Ua of the radial lines Q which becomes the other vehicle candidate region 60 may thereby be specified.

Because the radial line Q that includes the perpendicular direction contour line P is specified based on the radial line direction difference amount accumulation value of each of the radial lines Q, the radial line Q may be specified quickly and highly precisely compared to a case where the perpendicular direction contour line P is detected by conducting image processing such as contour extraction processing for the subtracted image G, for example.

FIG. 11 is an explanatory diagram of the edge intensity histogram Rb.

As illustrated in FIG. 11, the edge intensity histogram Rb is a graph that has the label number as the horizontal axis and has the value, which results from accumulation of presence and absence of the pixel value for each of the radial lines Q in an edge image E, (hereinafter referred to as "radial line direction edge intensity accumulation value") as the vertical axis.

The edge image E is an image in which in the overhead view image whose photographing timing is later (that is, the latest one) (the first overhead view image F1 in this embodiment) between the first overhead view image F1 and the second overhead view image F2, a contour component of an object (including a pattern or the like of the object) that appears in the overhead view image is extracted. Such an edge image E is generated by setting the pixel value of each pixel whose luminance difference from peripheral pixels is large (prescribed value or greater) in the overhead view image to the value (intensity value) that corresponds to the luminance difference.

That is, the edge intensity histogram Rb is a graph that illustrates the magnitude of an edge component of a solid object included in the radial line Q for each of the labels of the radial lines Q.

Returning to above-mentioned FIG. 6, in step Sb1B, the masked subtracted image generation unit 50 specifies the radial lines Q whose radial line direction difference amount accumulation values exceed the first threshold value Th1 in the difference histogram Ra and whose radial line direction edge intensity accumulation values exceed a prescribed second threshold value Th2 in the edge intensity histogram Rb. Then, in the lookup table 92, the masked subtracted image generation unit 50 sets the pixel value of "non-masked state" for those radial lines Q and sets the pixel value of "masked state" for the other radial lines Q.

Next, the masked subtracted image generation unit 50 generates the masking image 90 by setting each of the pixel values of the label image 91 based on the lookup table 92 (step Sb1C).

Figure 12:
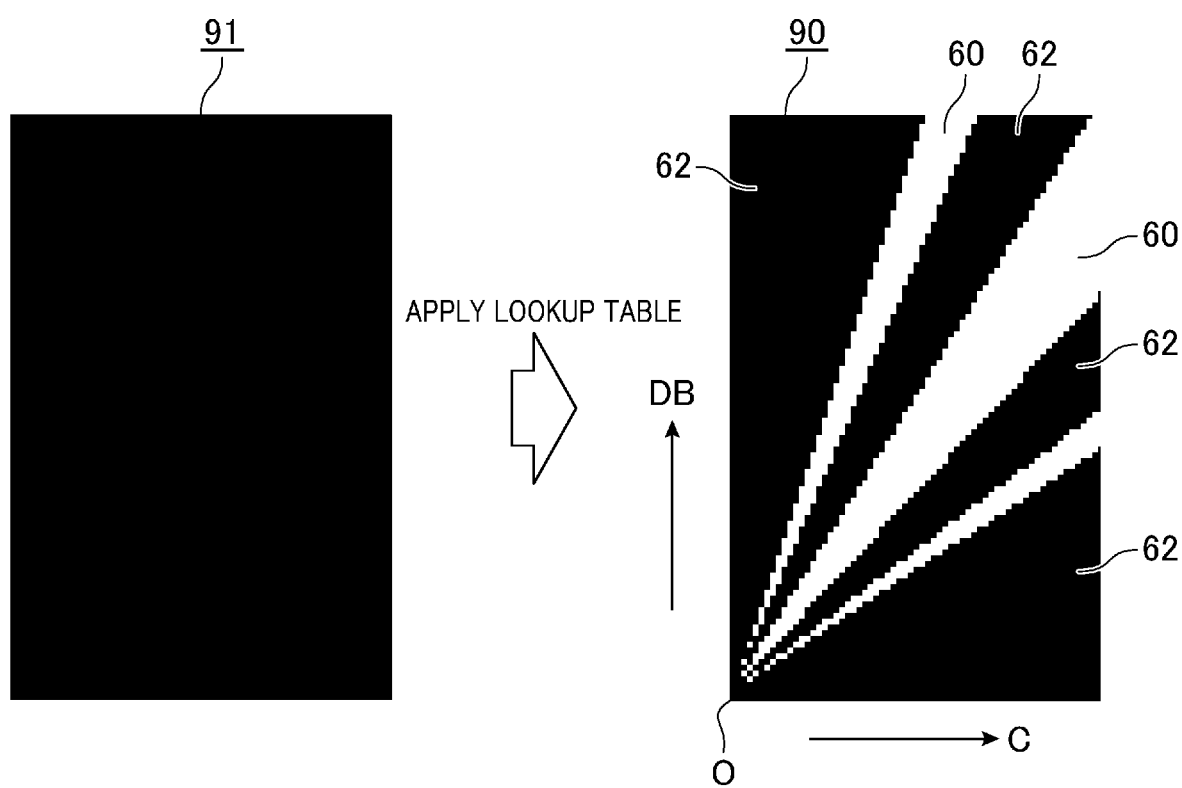
FIG. 12 is an explanatory diagram of a generation action of a masking image.

Accordingly, as illustrated in FIG. 12, the masking image 90 is obtained in which the other vehicle candidate region 60 becomes the non-masked state and the region other than the other vehicle candidate region 60 becomes the masking region 62.

Figure 13:
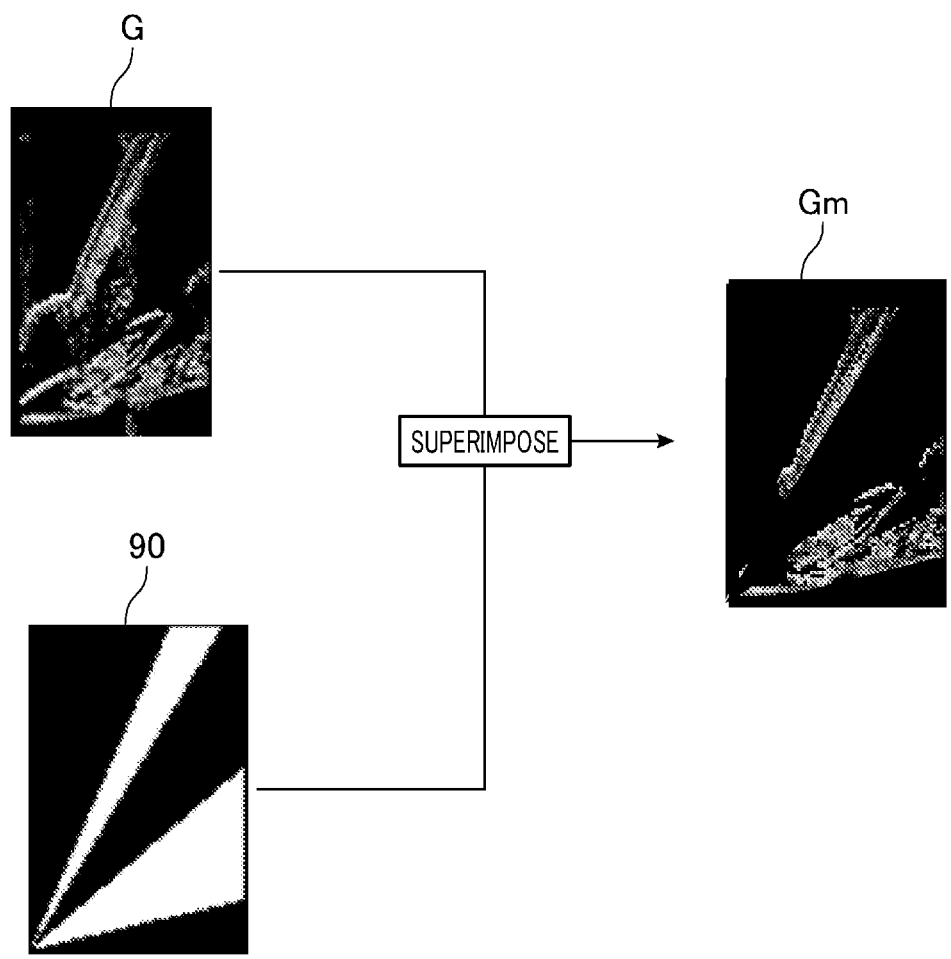
FIG. 13 is an explanatory diagram of a generation action of a masked subtracted image.

Then, the masked subtracted image generation unit 50 superimposes the masking image 90 on the subtracted image G in step Sb2 and generates the masked subtracted image Gm in which the region other than the other vehicle candidate region 60 is masked as the masking region 62 as illustrated in FIG. 13.

Figure 14:
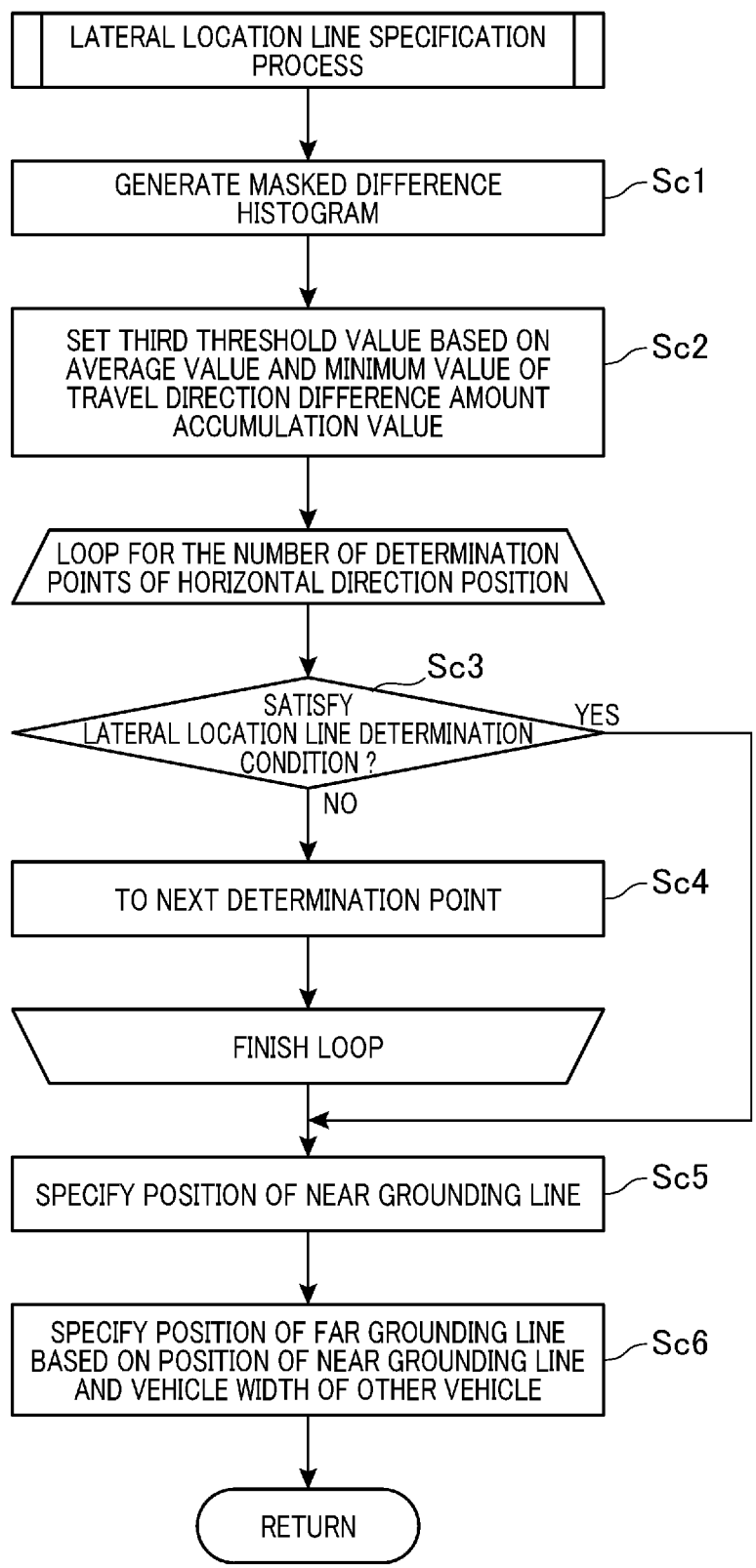
FIG. 14 is a flowchart of a lateral location line specification process.

FIG. 14 is a flowchart of the lateral location line specification process.

In the lateral location line specification process, the lateral location line specification unit 52 specifies the near grounding line L1 and the far grounding line L2 in the subtracted image G as the position of the other vehicle A based on the masked subtracted image Gm.

Specifically, the lateral location line specification unit 52 generates a masked difference histogram Rc in order to obtain the near grounding line L1 (step Sc1).

FIG. 15 is an explanatory diagram of the masked difference histogram Rc.

As illustrated in FIG. 15, the masked difference histogram Rc is a graph that has the position in a horizontal direction C orthogonal to the travel direction B of the vehicle 2 (hereinafter referred to as "horizontal direction position") as the horizontal axis and has the value, which results from accumulation of presence and absence of the pixel value along the travel direction B for each of regions provided by dividing the masked subtracted image Gm at prescribed intervals in the horizontal direction into strip-shaped small regions, (hereinafter referred to as "travel direction difference amount accumulation value") as the vertical axis. Because the region other than the other vehicle candidate region 60 is masked in the masked subtracted image Gm, the near grounding line L1 of the other vehicle A may be specified by the distribution of the travel direction difference amount accumulation value in the horizontal direction C.

Specifically, as illustrated in above-mentioned FIG. 14, the lateral location line specification unit 52 sets a third threshold value Th3 of the travel direction difference amount accumulation value of the horizontal direction position in which the other vehicle A is assumed to be present (step Sc2). As the third threshold value Th3, the intermediate value between an average value Ave of the travel direction difference amount accumulation value and a minimum value Min of the travel direction difference amount accumulation value (=(Ave+Min)/2) is set.

Next, the lateral location line specification unit 52 specifies the near grounding line L1 based on a range Uc of the horizontal direction positions, whose travel direction difference amount accumulation values successively exceed the third threshold value Th3 for a prescribed number or greater in the masked difference histogram Rc.

Figure 16:
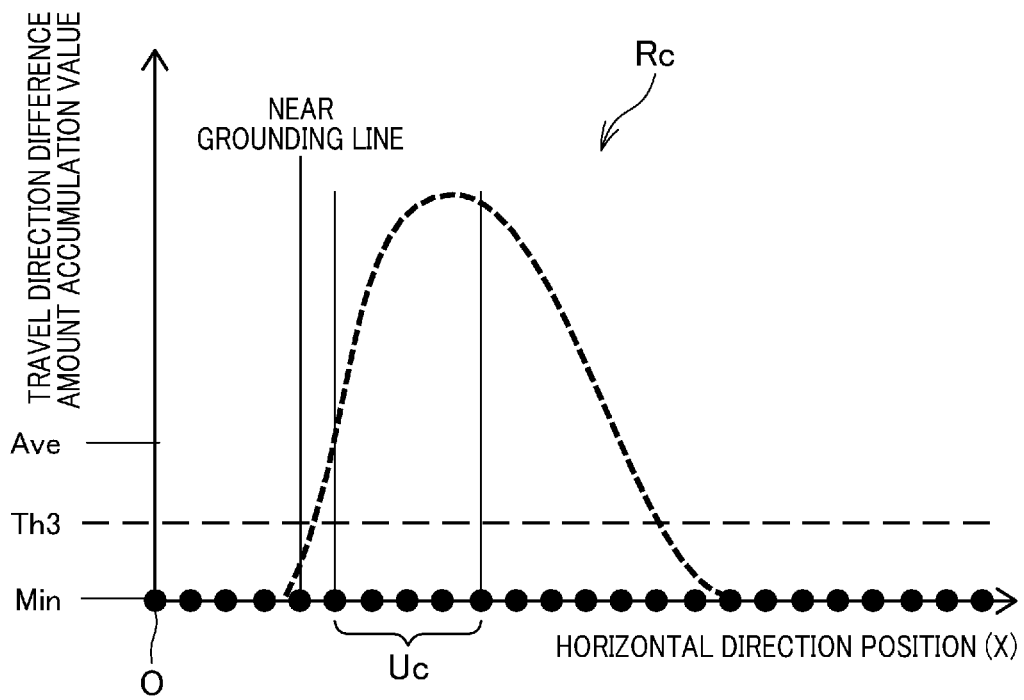
FIG. 16 is an explanatory diagram of a lateral location line specification action.

Specifically, as illustrated in FIG. 16, the lateral location line specification unit 52 sets determination points X at equivalent intervals at i parts (i denotes an integer of 1 or greater) on the horizontal axis of the masked difference histogram Rc. Each of the determination points X may be caused to correspond to a section (a bar of the graph) on the horizontal axis of the masked difference histogram Rc.

Then, as illustrated in above-mentioned FIG. 14, the lateral location line specification unit 52 determines whether or not the determination point X satisfies a prescribed lateral location line determination condition sequentially from the determination point X closer to the photographing position O (step Sc3) and performs the determination about the next determination point X (step Sc4) in a case where the prescribed lateral location line determination condition is not satisfied (step Sc3: No). In a case where the lateral location line determination condition is satisfied (step Sc3:

Yes), the lateral location line specification unit 52 specifies the determination point X as the position of the near grounding line L1 (step Sc5).

The above lateral location line determination condition is a condition that the travel direction difference amount accumulation value at the determination point X is the third threshold value Th3 or smaller and the travel direction difference amount accumulation values are the third threshold value Th3 or greater at all of a prescribed number of determination points X from the next determination point X.

The determination is performed about the lateral location line determination condition sequentially from the determination point X closer to the photographing position O, as illustrated in FIG. 16, the determination point X in immediate front, as seen from the photographing position O, with respect to the range Uc in which all of the travel direction difference amount accumulation values at the prescribed number of determination points X exceed the third threshold value Th3 is thereby obtained, and this determination point X is specified as the near grounding line L1. Accordingly, the near grounding line L1 is not set to a position on the inside of the other vehicle A (the range in which the third threshold value Th3 is exceeded), and the near grounding line L1 is set to a more accurate position.

Then, as illustrated in above-mentioned FIG. 14, the lateral location line specification unit 52 specifies the position of the far grounding line L2 based on the position of the near grounding line L1 and the vehicle width of the other vehicle A (step Sc6). As the vehicle width of the other vehicle A, a value that is in advance set for each of a small-sized vehicle, a standard-sized vehicle, and a large-sized vehicle is used. That is, in step Sc6, the lateral location line specification unit 52 specifies which of the small-sized vehicle, the standard-sized vehicle, and the large-sized vehicle the vehicle model of the other vehicle A corresponds to based on the size or shape of the other vehicle candidate region 60 in the subtracted image G, adds the vehicle width that corresponds to the specified vehicle model to the position of the near grounding line L1, and thereby specifies the position of the far grounding line L2 in the subtracted image G.

By the above lateral location line specification process, the near grounding line L1 and the far grounding line L2 as the position of the other vehicle A in the horizontal direction C as seen from the vehicle 2 is specified.

As described above, the position of the near grounding line L1 in the subtracted image G is specified based on not the subtracted image G but the masked subtracted image Gm in which noise such as the shadow 76 is masked, and the specified position thus becomes very accurate.

Returning to above-mentioned FIG. 4, when the lateral location line specification process is finished (step Sa7), the solid object region specification unit 54 specifies the front end VF and the rear end VB of the other vehicle A based on the near grounding line L1 and the far grounding line L2 and thereby executes a solid object region specification process for detecting the other vehicle region H in the subtracted image G (step Sa8).

Figure 17:
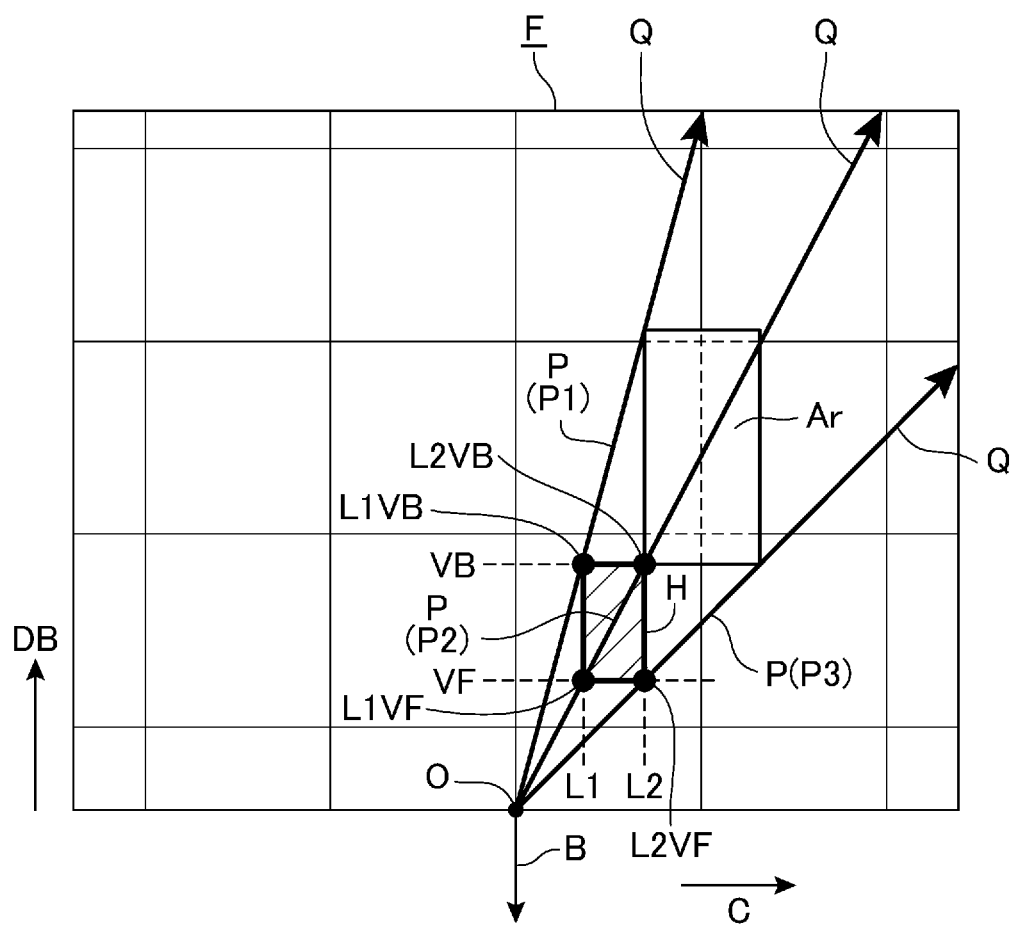
FIG. 17 is a diagram that illustrates the relationship between a near grounding line and far grounding line and a perpendicular direction contour line in an overhead view image.

FIG. 17 is a diagram that illustrates the relationship between the near grounding line L1 and the far grounding line L2 and the perpendicular direction contour lines P in the overhead view image F.

As a method of obtaining the front end VF and the rear end VB of the other vehicle A by using the near grounding line L1, the following method is present. That is, as illustrated in FIG. 17, a method is used which obtains the intersection points between a rear-end close side perpendicular direction contour line P1 and a front-end close side perpendicular direction contour line P2 of the perpendicular direction contour lines P of the other vehicle A and the near grounding line L1 in the overhead view image F. By those intersection points, a rear-end close side position L1VB and a front-end close side position L1VF in the near grounding line L1 are obtained.

Note that the rear-end close side perpendicular direction contour line P1 indicates the perpendicular direction contour line P on a rear end side of the other vehicle A and on a close side to the photographing position O, and the front-end close side perpendicular direction contour line P2 indicates the perpendicular direction contour line P on a front end side of the other vehicle A and on a close side to the photographing position O.

However, because the other vehicle A appears while being distorted in the directions of the radial lines Q in the overhead view image F, the other vehicle region H that extends longer in the travel direction B than an actual situation is detected due to an influence of a roof portion Ar or the like of the other vehicle A, and an error occurs to the position of the other vehicle A.

In the solid object region specification process of this embodiment, in order to remove such an error, the solid object region specification unit 54 specifies the other vehicle region H in the following manner.

Figure 18:
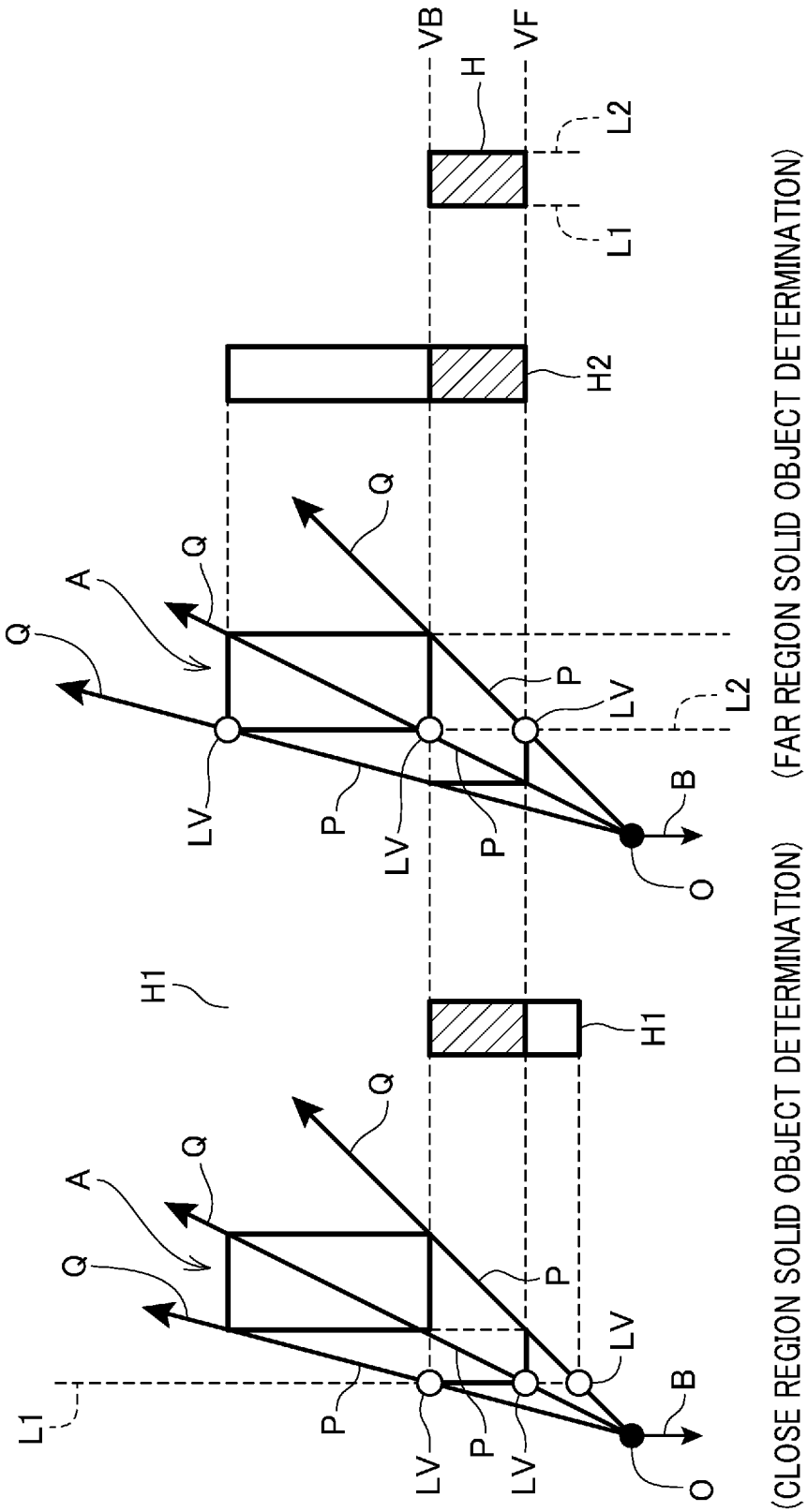
FIG. 18 is an outline explanation diagram of a solid object region specification process.

That is, as illustrated in FIG. 18, the solid object region specification unit 54 obtains intersection points LV with the radial lines Q including the perpendicular direction contour lines P of the other vehicle A for each of the near grounding line L1 and the far grounding line L2. Next, the solid object region specification unit 54 specifies an other vehicle region H1 from the intersection points LV in the near grounding line L1 and specifies an other vehicle region H2 from the intersection points LV in the far grounding line L2. Then, the solid object region specification unit 54 specifies the front end VF and the rear end VB of the other vehicle A based on the area in which the other vehicle region H1 and the other vehicle region H2 overlap with each other. Accordingly, as for the other vehicle A, the other vehicle region H demarcated by the near grounding line L1, the far grounding line L2, the front end VF, and the rear end VB is specified.

In the following, such a solid object region specification process will be described more in detail.

Figure 19:
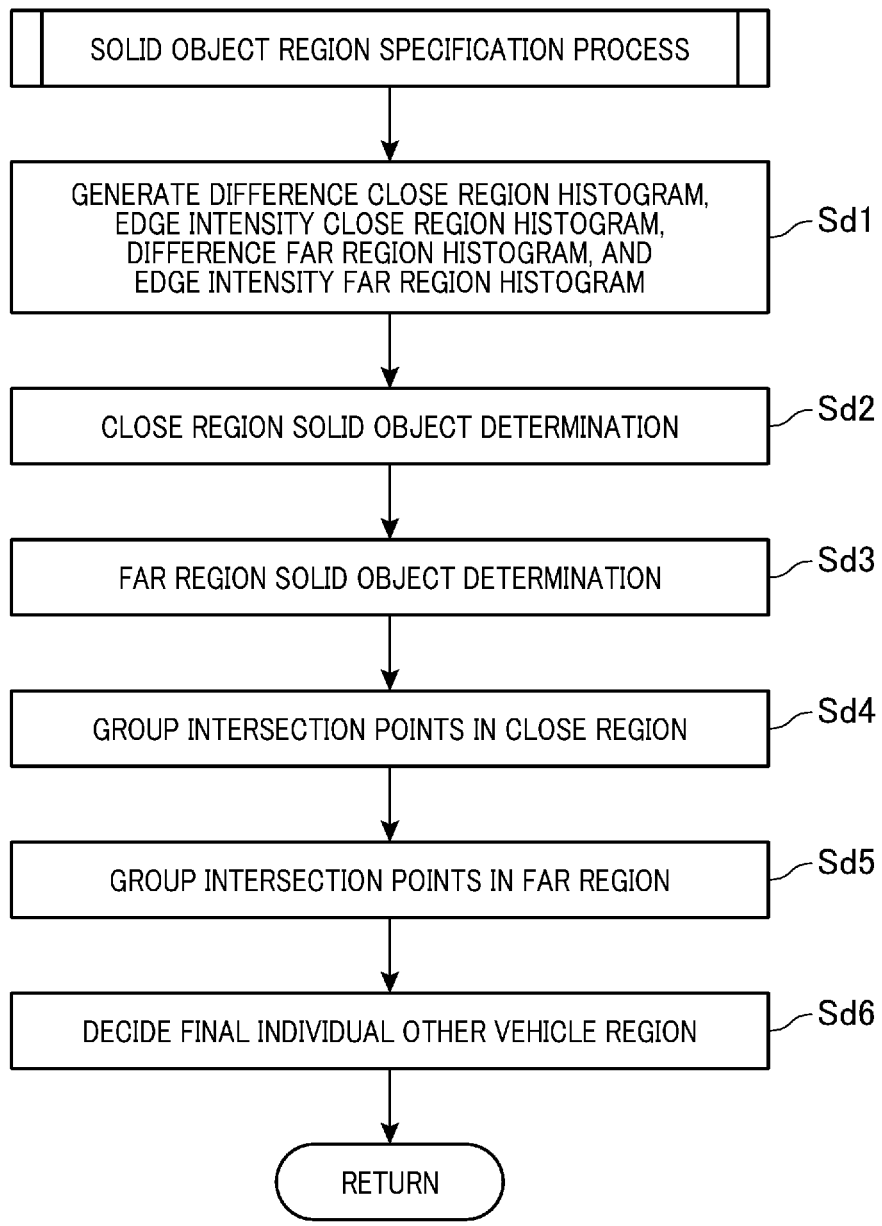
FIG. 19 is a flowchart of the solid object region specification process.

FIG. 19 is a flowchart of the solid object region specification process.

In order to specify the respective other vehicle regions H1 and H2 of the near grounding line L1 and the far grounding line L2, the solid object region specification unit 54 first generates a difference close region histogram Ran, an edge intensity close region histogram Rbn, a difference far region histogram Raf, and an edge intensity far region histogram Rbf (step Sd1).

FIG. 20 is an explanatory diagram of the difference close region histogram Ran, and FIG. 21 is an explanatory diagram of the edge intensity close region histogram Rbn.

As illustrated in FIG. 20, the difference close region histogram Ran is the above-described difference histogram Ra that is obtained for a close region Jn in the subtracted image G, and as illustrated in FIG. 21, the edge intensity close region histogram Rbn is the above-described edge intensity histogram Rb that is obtained for the close region Jn in the edge image E.

The close region Jn is a region interposed between the near grounding line L1 and the far grounding line L2 in the subtracted image G.

FIG. 22 is an explanatory diagram of the difference far region histogram Raf, and FIG. 23 is an explanatory diagram of the edge intensity far region histogram Rbf.

As illustrated in FIG. 22, the difference far region histogram Raf is the above-described difference histogram Ra that is obtained for a far region Jf in the subtracted image G, and as illustrated in FIG. 23, the edge intensity far region histogram Rbf is the above-described edge intensity histogram Rb that is obtained for the far region Jf in the edge image E.

The far region Jf is a farther region than the near grounding line L1, as seen from the photographing position O, in the subtracted image G.

A close region masked label image 91n is used for generation of the difference close region histogram Ran and the edge intensity close region histogram Rbn, and a far region masked label image 91f is used for generation of the difference far region histogram Raf and the edge intensity far region histogram Rbf.

Figure 24:
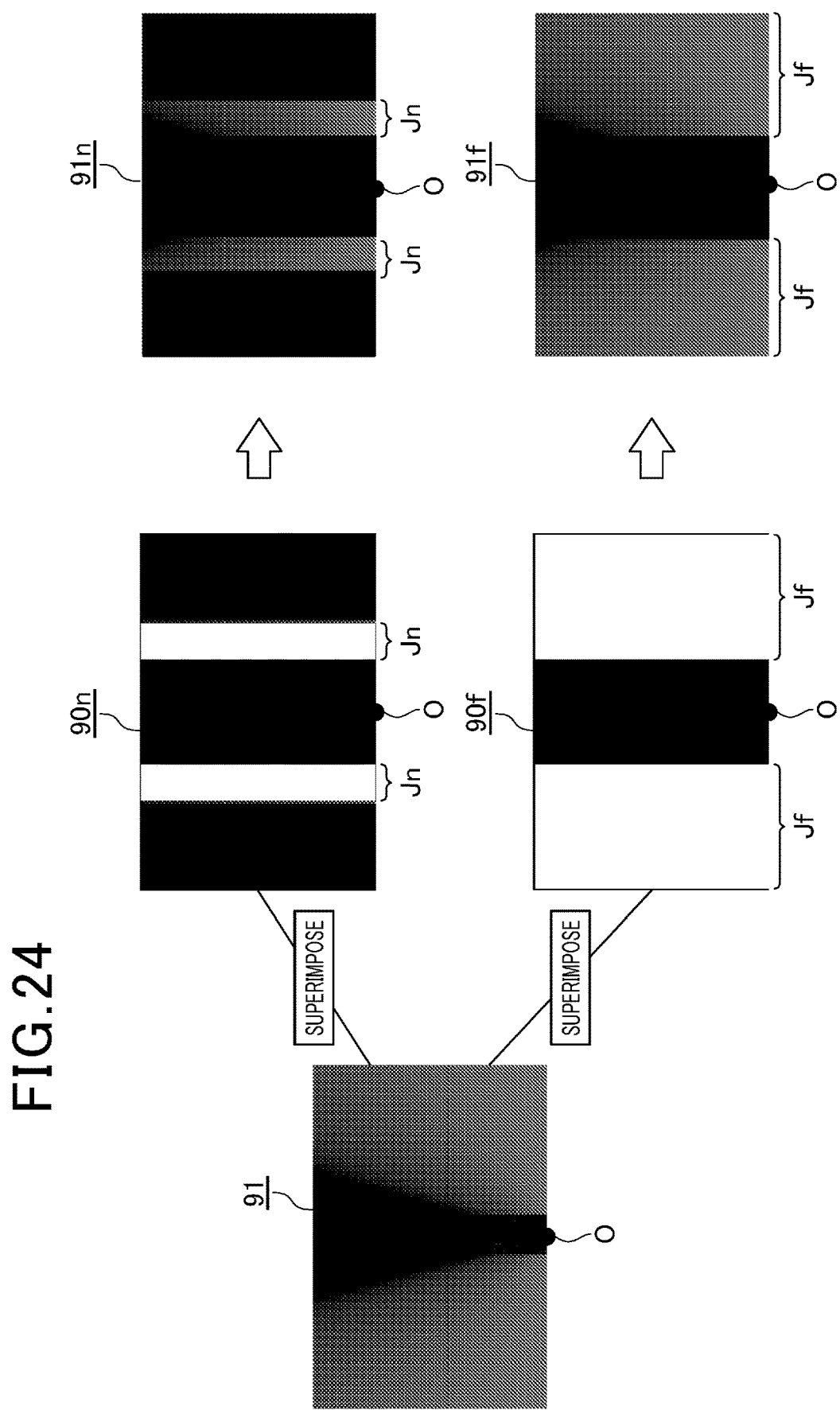
FIG. 24 is an explanatory diagram of a close region masked label image and a far region masked label image.

FIG. 24 is an explanatory diagram of the close region masked label image 91n and the far region masked label image 91f.

The close region masked label image 91n is an image in which the pixel values other than the close region Jn in the subtracted image G are invalidated and are excluded from the count of the accumulation value. As illustrated in FIG. 24, such a close region masked label image 91n is obtained by superimposing the close region masking image 90n for masking the region other than the close region Jn in the subtracted image G on the above-described label image 91.

The solid object region specification unit 54 obtains the difference histogram Ra and the edge intensity histogram Rb by using the close region masked label image 91n, only the pixel values in the close region Jn thereby become targets of addition for the accumulation value, and the difference close region histogram Ran and the edge intensity close region histogram Rbn are obtained.

The far region masked label image 91f is an image, in which the pixel values other than the far region Jf are invalidated in the subtracted image G and are excluded from the count of the accumulation value, and is obtained by superimposing the far region masking image 90f for masking the region other than the far region Jf in the subtracted image G on the above-described label image 91.

The solid object region specification unit 54 obtains the difference histogram Ra and the edge intensity histogram Rb by using the far region masked label image 91f, only the pixel values in the far region Jf thereby become targets of addition for the accumulation value, and the difference far region histogram Raf and the edge intensity far region histogram Rbf are obtained.

Returning to above-mentioned FIG. 19, the solid object region specification unit 54 next performs a solid object determination in the close region Jn based on the difference close region histogram Ran and the edge intensity close region histogram Rbn (step Sd2).

Specifically, the solid object region specification unit 54 specifies the radial lines Q of the label numbers, whose radial line direction difference amount accumulation values are a fourth threshold value Th4 (FIG. 20) or greater in the difference close region histogram Ran and whose radial line direction edge intensity accumulation values are a fifth threshold value Th5 (FIG. 21) or greater in the edge intensity close region histogram Rbn.

Figure 25:
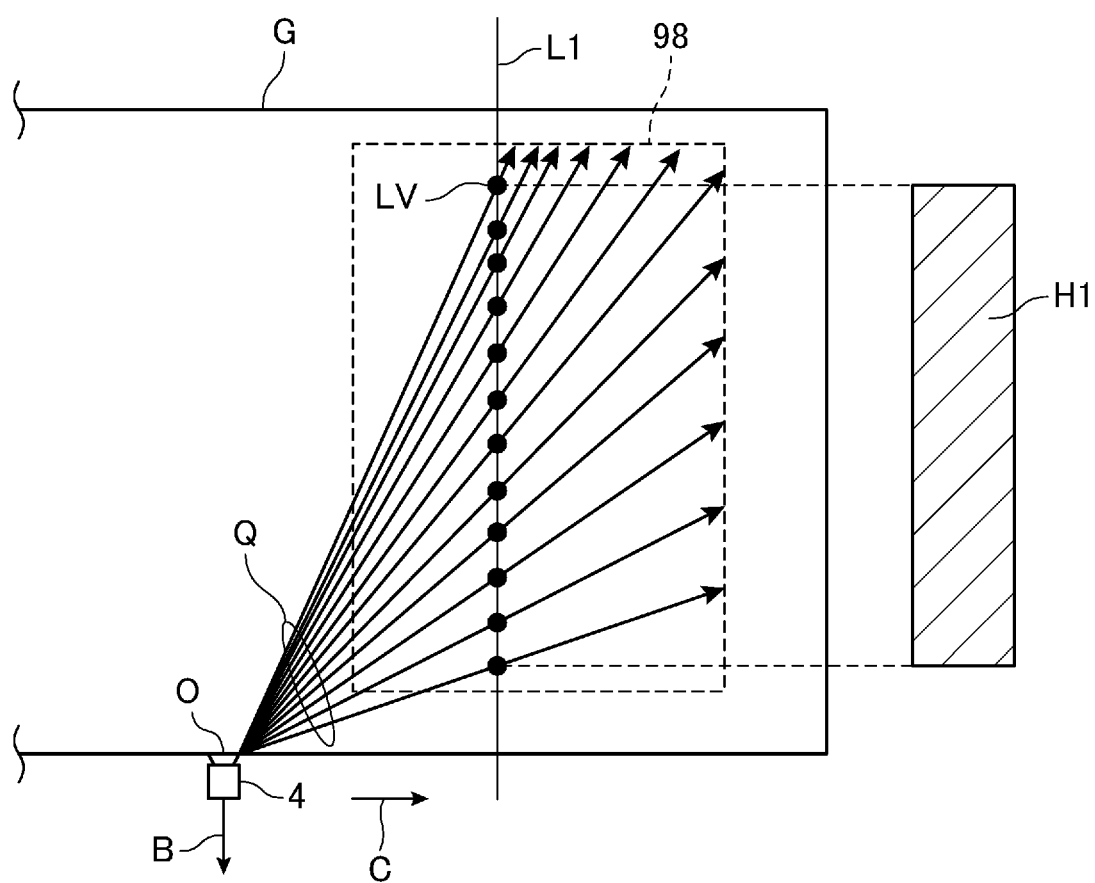
FIG. 25 is an explanatory diagram of an other vehicle region specification action in a case where solid object detection is performed by limiting a region to a close region.

Then, as illustrated in FIG. 25, the solid object region specification unit 54 specifies the intersection points LV between the specified radial lines Q and the near grounding line L1 in the subtracted image G. Specification of those intersection points LV is performed only for a prescribed detection region set in the subtracted image G. This detection region is the above detection region 72 (FIG. 3 and FIG. 5) or the like, for example.

The other vehicle region H1 in a case where solid object detection is performed by limiting the region to the close region Jn is specified by those intersection points LV. Note that the width of the other vehicle region H1 in the horizontal direction C (that is, the vehicle width of the other vehicle A) is specified based on the positions of the near grounding line L1 and the far grounding line L2.

Returning to above-mentioned FIG. 19, the solid object region specification unit 54 performs the solid object determination in the far region Jf based on the difference far region histogram Raf and the edge intensity far region histogram Rbf (step Sd3). Accordingly, the other vehicle region H2 in a case where solid object detection is performed by limiting the region to the far region Jf is specified.

Here, in a case where plural other vehicles A are traveling in column, there is a possibility that two or more other vehicles A are included in the other vehicle regions H1 and H2.

Thus, the solid object region specification unit 54 groups the intersection points LV in the near grounding line L1 and the intersection points LV in the far grounding line L2 for each single other vehicle A in the following manner (steps Sd4 and Sd5).

Figure 26:
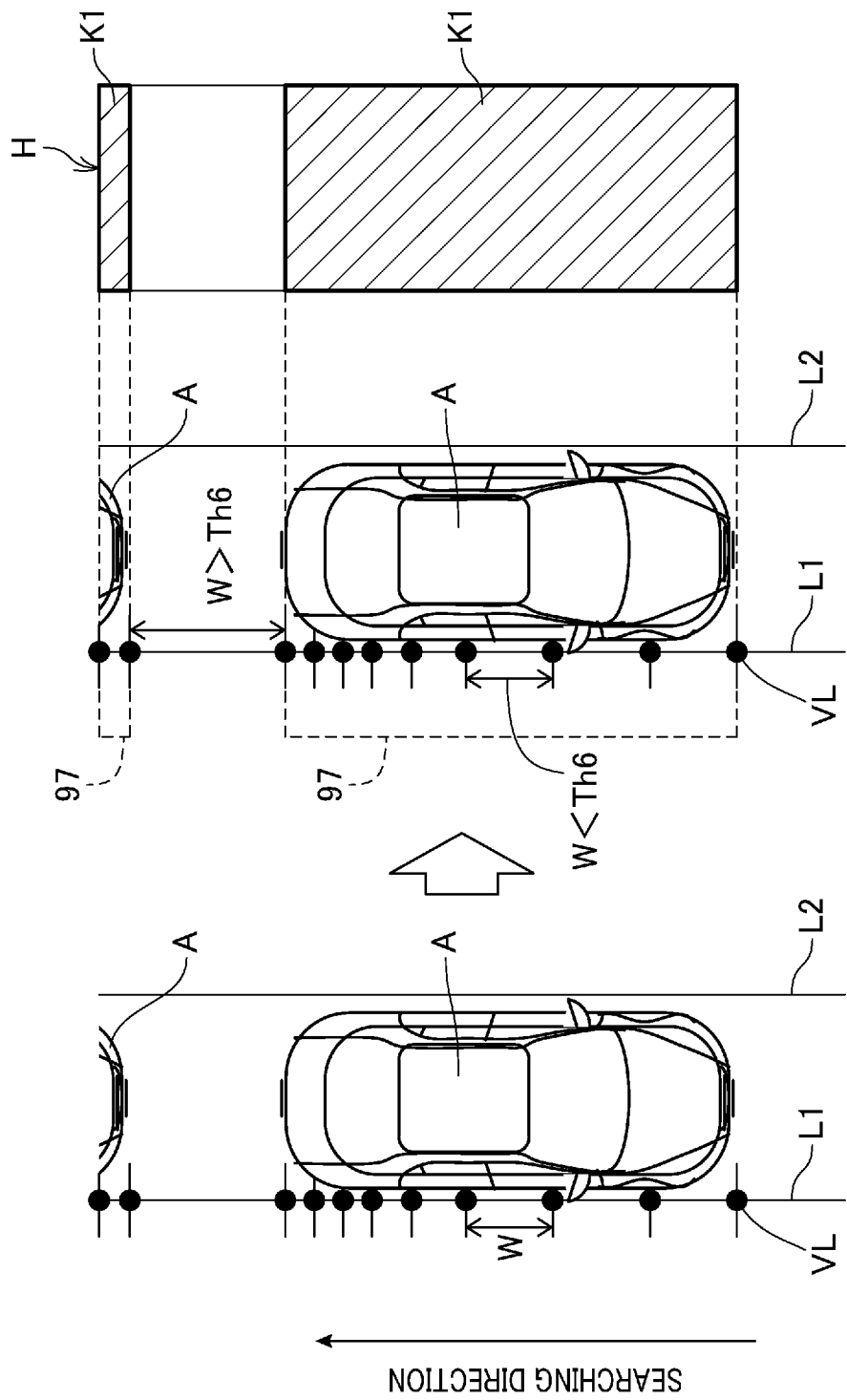
FIG. 26 is an explanatory diagram of a grouping action of intersection points on the near grounding line.

Raising the intersection points LV of the near grounding line L1 as an example, as illustrated in FIG. 26, the solid object region specification unit 54 searches for the intersection points LV in the near grounding line L1 in order of closeness to the photographing position O, categorizes two intersection points LV into the same group 97 in a case where a distance W between the neighboring two intersection points LV is a prescribed sixth threshold value Th6 or smaller, and categorizes the farther intersection point LV from the photographing position O into a new group 97 in a case where the distance W exceeds the sixth threshold value Th6. Accordingly, the groups 97 are separated in a part in which the interval between the intersection points LV is greater than the sixth threshold value Th6, that is, between two other vehicles A, and the intersection points LV are grouped for each of the other vehicles A.

Then, for each of the groups 97, the solid object region specification unit 54 specifies an individual other vehicle region K1 by the intersection points LV that belong to the group 97, and the other vehicle region H1 is thereby separated for each of the individual other vehicles A.

Returning to above-mentioned FIG. 19, the solid object region specification unit 54 decides a final individual other vehicle region K based on the individual other vehicle region K1 specified for the near grounding line L1 and an individual other vehicle region K2 specified for the far grounding line L2 (step Sd6).

Figure 27:
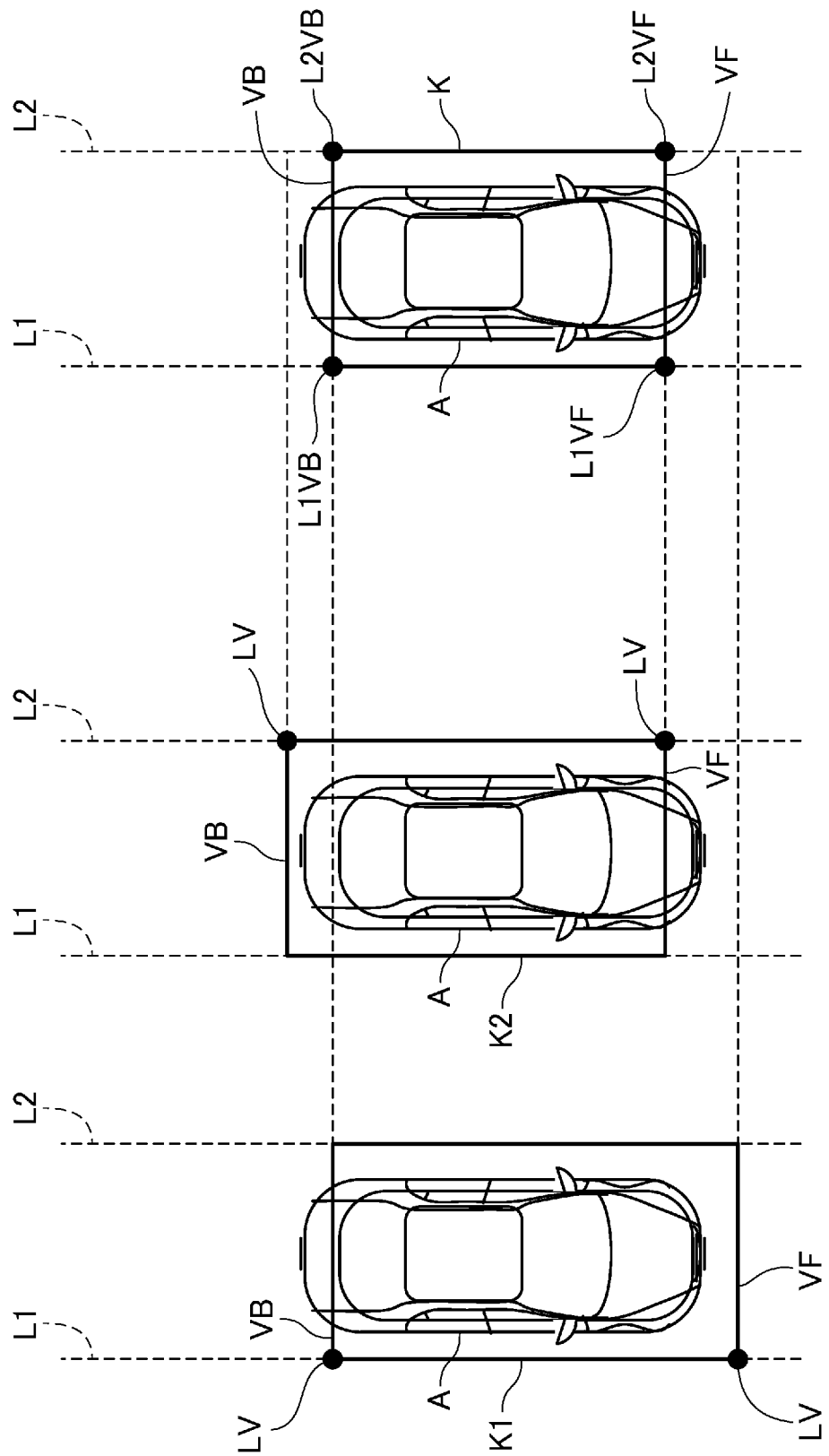
FIG. 27 is an explanatory diagram of a deciding action of a final individual other vehicle region.

That is, as illustrated in FIG. 27, the front end VF and the rear end VB, which are present in the range in which the individual other vehicle region K1 and the individual other vehicle region K2 overlap with each other, between the front ends VF and the rear ends VB of the respective other vehicles A in the individual other vehicle region K1 and the individual other vehicle region K2 are specified as the front end VF and the rear end VB of the final individual other vehicle region K.

Then, an error caused by distortion due to projective transformation is removed by those front end VF and rear end VB, the near grounding line L1, and the far grounding line L2, and an accurate position of the rectangular individual other vehicle region K is thereby specified.

The above-described embodiment provides the following effects.

The camera ECU 6 (solid object detection device) of this embodiment generates the masked subtracted image GM, in which the region other than the other vehicle candidate region 60 as a candidate where the other vehicle A appears is masked in the subtracted image G between the first overhead view image F1 and the second overhead view image F2 whose photographing positions O are aligned with each other, and specifies the position of the other vehicle A in the subtracted image G based on the masked subtracted image Gm.

Accordingly, even in a case where the shadow 76 is present between the traveling vehicle 2 and the other vehicle in the periphery, the position of the other vehicle A may precisely be specified.

Consequently, the vehicle control unit 8 may realize more accurate autonomous driving control based on the accurate position of the other vehicle A in a circumstance such as approaching the other vehicle in changing a lane, merging, or diverging.

The camera ECU 6 of this embodiment specifies the near grounding line L1 of the other vehicle A in the subtracted image G based on the position on the horizontal axis, in which the travel direction difference amount accumulation value exceeds the third threshold value Th3, in the masked difference histogram Rc, and the near grounding line L1 is thus specified accurately.

The camera ECU 6 of this embodiment specifies the closest range Uc to the photographing position O in the range in which the travel direction difference amount accumulation value successively exceeds the third threshold value Th3 on the horizontal axis of the masked difference histogram Rc and specifies a spot in immediate front of the range Uc, as seen from the photographing position O, as the position of the near grounding line L1. Accordingly, the near grounding line L1 is not set to a position on the inside of the other vehicle A, and the near grounding line L1 is set to a more accurate position.

The camera ECU 6 of this embodiment specifies the far grounding line L2 of the other vehicle A in the subtracted image G based on the vehicle width of the other vehicle A and the near grounding line L1. The position of the other vehicle A in the horizontal direction C orthogonal to the travel direction B of the vehicle 2 is specified by the near grounding line L1 and the far grounding line L2.

The camera ECU 6 of this embodiment specifies the radial lines Q whose radial line direction difference amount accumulation values are the first threshold value Th1 or smaller in the difference histogram Ra, masks the region that corresponds to those radial lines Q in the subtracted image G, and thereby generates the masked subtracted image Gm. Accordingly, the region other than the other vehicle candidate region 60 may efficiently be masked.

The camera ECU 6 of this embodiment specifies the radial lines Q whose radial line direction edge intensity accumulation values are the second threshold value Th2 or smaller in the edge intensity histogram Rb, masks the region that corresponds to those radial lines Q in the subtracted image G, and thereby generates the masked subtracted image Gm. Accordingly, even if a road surface marking or the like such as the white line 74 emerges in the subtracted image G, the region other than the other vehicle candidate region 60 may accurately be masked.

The camera ECU 6 of this embodiment specifies the other vehicle region H1 where the other vehicle A is positioned in the near grounding line L1 and the other vehicle region H2 where the other vehicle A is positioned in the far grounding line L2 based on the intersection points LV between the radial lines Q including the perpendicular direction contour lines P of the other vehicle A and each of the near grounding line L1 and the far grounding line L2 and specifies the other vehicle region H in the subtracted image G based on the range in which those two other vehicle regions H1 and H2 overlap with each other.

Accordingly, while an influence of distortion due to projective transformation is removed, the other vehicle region H may accurately be specified.

The camera ECU 6 of this embodiment specifies the radial lines Q, whose radial line direction difference amount accumulation values are the fourth threshold value Th4 or greater in the difference close region histogram Ran and the difference far region histogram Raf, as the radial lines Q including the perpendicular direction contour lines P of the other vehicle A. Accordingly, such radial lines Q may efficiently be obtained.

The camera ECU 6 of this embodiment specifies the radial lines Q, whose radial line direction edge intensity accumulation values are the fifth threshold value Th5 or greater in the edge intensity close region histogram Rbn and the edge intensity far region histogram Rbf, as the radial lines Q including the perpendicular direction contour lines P of the other vehicle A. Accordingly, even if a road surface marking such as the white line 74 emerges in the subtracted image G, such radial lines Q may accurately be obtained.

The camera ECU 6 of this embodiment obtains the radial lines Q including the perpendicular direction contour lines P based on the subtracted image G in which the region other than the close region Jn interposed between the near grounding line L1 and the far grounding line L2, specifies the other vehicle region H1 based on the intersection points LV between the radial lines Q and the near grounding line L1, obtains the radial lines Q including the perpendicular direction contour lines P based on the subtracted image G in which the region other than the far region Jf which is farther than the near grounding line L1 when seen from the photographing position O, and specifies the other vehicle region H2 based on the intersection points LV between the radial lines Q and the far grounding line L2.

Accordingly, the two other vehicle regions H1 and H2 may accurately be obtained.

Note that the above-described embodiment merely represents one aspect of the present invention as an example, and any modification and application are possible without departing from the scope of the gist of the present invention.

In the above-described embodiment, a case where the camera 4 photographs the rear area DB of the vehicle 2 is described as an example, but the camera 4 may be applied to a case of photographing any of a left side, a right side, and a front area of the vehicle 2.

In the above-described embodiment, the camera ECU 6 functions as the solid object detection device; however, the solid object detection device is not limited to this, and an arbitrary device included in the in-vehicle system 1 may function as the solid object detection device.

In the above-described embodiment, the function blocks illustrated in FIG. 2 represent a schematic diagram that illustrates configuration elements of the camera ECU 6 by categorizing those in accordance with principal processing contents for easy understanding of the invention of this application, and the configuration elements of the camera ECU 6 may be categorized into more configuration elements in accordance with processing contents. Categorization may be made such that one configuration element executes more pieces of processing.

In the above-described embodiment, directions such as horizontal and vertical directions and various kinds of shapes include direction around those and similar shapes (so-called range of equivalents) unless otherwise mentioned and as long as the same work and effect are provided.

REFERENCE SIGNS LIST

2 vehicle
4 camera
6 camera ECU (solid object detection device)
24 solid object position specification unit
32 luminance transformation processing unit
34 overhead view transformation processing unit
36 subtracted image generation unit
50 masked subtracted image generation unit
52 lateral location line specification unit
54 solid object region specification unit
62 masking region
90 masking image
90f far region masking image
90n close region masking image
A other vehicle
B travel direction
C horizontal direction
E edge image
F, F1, F2 overhead view image
G subtracted image
Gm masked subtracted image
H, H1, H2 other vehicle region
Jf far region
Jn close region
K, K1, K2 individual other vehicle region
L1 near grounding line
L2 far grounding line
LV intersection point
M photographed image
O photographing position
P perpendicular direction contour line
Q radial line
Ra difference histogram
Raf difference far region histogram
Ran difference close region histogram
Rb edge intensity histogram
Rbf edge intensity far region histogram
Rbn edge intensity close region histogram
Rc masked difference histogram
VB rear end
VF front end

What is claimed is:

1. A solid object detection device comprising:
a processor that
transforms a first photographed image and a second photographed image which are photographed by a camera at different timings in travel of a vehicle into a first overhead view image and a second overhead view image, respectively;
generates a subtracted image between the first overhead view image and the second overhead view image whose photographing positions are aligned with each other;
specifies a position of a solid object present around the vehicle based on the subtracted image; and
generates a masked subtracted image in which a region other than a solid object candidate region where the solid object appears is masked in the subtracted image is masked, wherein
the processor
specifies a position of the solid object in the subtracted image based on the masked subtracted image,
specifies a near grounding line of the solid object in the subtracted image based on a position on a horizontal axis in which a travel direction difference amount accumulation value exceeds a third threshold value in a masked difference histogram, which has a horizontal direction orthogonal to a travel direction of the vehicle as a horizontal axis and has the travel direction difference amount accumulation value resulting from accumulation of a pixel value of each pixel of the masked subtracted image along the travel direction as a vertical axis, and
specifies the position of the solid object in the subtracted image based on the near grounding line specified.

2. The solid object detection device according to claim 1, wherein the processor
specifies a closest range to the photographing position in a range in which the travel direction difference amount accumulation value successively exceeds the third threshold value on the horizontal axis of the masked difference histogram and specifies a spot in immediate front of the range, as seen from the photographing position, as a position of the near grounding line.

3. The solid object detection device according to claim 2, wherein processor
specifies a far grounding line of the solid object in the subtracted image based on a width of the solid object and the near grounding line.

4. The solid object detection device according to claim 3, wherein
the processor
specifies a first region in which the solid object is positioned in the near grounding line and a second region in which the solid object is positioned in the far grounding line based on an intersection point between a radial line which extends from the photographing position in the subtracted image and includes a perpendicular direction contour line of the solid object and each of the near grounding line and the far grounding line and that specifies a solid object region in which the solid object appears in the subtracted image based on a range in which the first region and the second region overlap with each other.

5. The solid object detection device according to claim 4, wherein
the processor
specifies a radial line whose radial line direction difference amount accumulation value is a fourth threshold value or greater in a difference histogram, which has each of plural radial lines extending from the photographing position in the subtracted image as a horizontal axis and has the radial line direction difference amount accumulation value resulting from accumulation of each pixel value of the subtracted image along the radial line as a vertical axis, as the radial line which includes the perpendicular direction contour line of the solid object.

6. The solid object detection device according to claim 4, wherein
the processor
specifies a radial line whose radial line direction edge intensity accumulation value is a fifth threshold value or greater in an edge intensity histogram, which has each of plural radial lines extending from the photographing position in an edge image which extracts a contour component of the solid object from an image corresponding to a photographed image being photographed latest between the first overhead view image and the second overhead view image as a horizontal axis and has the radial line direction edge intensity accumulation value resulting from accumulation of each pixel value of the edge image along the radial line as a vertical axis, as the radial line which includes the perpendicular direction contour line of the solid object.

7. The solid object detection device according to claim 4, wherein
the processor
obtains the radial line based on the subtracted image in which a region other than a region interposed between the near grounding line and the far grounding line is masked, specifies the first region based on an intersection point between the radial line and the near grounding line,
obtains the radial line based on the subtracted image in which a region other than a far region which is farther than the near grounding line when seen from the photographing position is masked, and specifies the second region based on an intersection point between the radial line and the far grounding line.

8. The solid object detection device according to claim 1, wherein
the processor
specifies a radial line whose radial line direction edge intensity accumulation value is a second threshold value or smaller in an edge intensity histogram, which has each of plural radial lines extending from the photographing position in an edge image which extracts a contour component of the solid object from an image corresponding to a photographed image being photographed latest between the first overhead view image and the second overhead view image as a horizontal axis and has the radial line direction edge intensity accumulation value resulting from accumulation of each pixel value of the edge image along the radial line as a vertical axis, and masks a region that corresponds to the radial line in the subtracted image.

9. A solid object detection device comprising:
a processor that
transforms a first photographed image and a second photographed image which are photographed by a camera at different timings in travel of a vehicle into a first overhead view image and a second overhead view image, respectively;
generates a subtracted image between the first overhead view image and the second overhead view image whose photographing positions are aligned with each other;
specifies a position of a solid object present around the vehicle based on the subtracted image; and
generates a masked subtracted image in which a region other than a solid object candidate region where the solid object appears is masked in the subtracted image, wherein
the processor
specifies a position of the solid object in the subtracted image based on the masked subtracted image, and
specifies a radial line whose radial line direction difference amount accumulation value is a first threshold value or smaller in a difference histogram, which has each of plural radial lines extending from the photographing position in the subtracted image as a horizontal axis and has the radial line direction difference amount accumulation value resulting from accumulation of each pixel value of the subtracted image along the radial line as a vertical axis, and masks a region that corresponds to the radial line in the subtracted image.

10. A solid object detection method comprising:
a first step of transforming a first photographed image and a second photographed image which are photographed by a camera at different timings in travel of a vehicle into a first overhead view image and a second overhead view image, respectively;
a second step of generating a subtracted image between the first overhead view image and the second overhead view image whose photographing positions are aligned with each other;
a third step of generating a masked subtracted image in which a region other than a solid object candidate region where a solid object appears is masked in the subtracted image; and
a fourth step of specifying a position of the solid object in the subtracted image based on the masked subtracted image, wherein
the fourth step includes
specifying a near grounding line of the solid object in the subtracted image based on a position on a horizontal axis in which a travel direction difference amount accumulation value exceeds a third threshold value in a masked difference histogram, which has a horizontal direction orthogonal to a travel direction of the vehicle as a horizontal axis and has the travel direction difference amount accumulation value resulting from accumulation of a pixel value of each pixel of the masked subtracted image along the travel direction as a vertical axis, and
specifying the position of the solid object in the subtracted image based on the near grounding line specified.

* * * * *